US006457045B1

(12) United States Patent
Hanson et al.

(10) Patent No.: US 6,457,045 B1
(45) **Date of Patent: *Sep. 24, 2002**

(54) SYSTEM AND METHOD FOR GROUP CHOICE MAKING

(75) Inventors: Michael Hanson, Menlo Park, CA (US); Graham Miller, San Francisco, CA (US); Brian Axe, San Francisco, CA (US); Steven Richard Evans, Los Altos Hills, CA (US)

(73) Assignee: Zaplet, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,361

(22) Filed: Jan. 14, 2000

Related U.S. Application Data

(63) Continuation-in-part of application No. 09/427,152, filed on Oct. 25, 1999, and a continuation-in-part of application No. 09/426,648, filed on Oct. 25, 1999, and a continuation-in-part of application No. 09/427,378, filed on Oct. 25, 1999.
(60) Provisional application No. 60/151,650, filed on Aug. 31, 1999, and provisional application No. 60/151,476, filed on Aug. 30, 1999.

(51) Int. Cl.$^{7}$ .................................................. G06F 13/38
(52) U.S. Cl. ....................... 709/206; 709/204; 709/220; 707/10
(58) Field of Search ................................ 709/201, 222, 709/206, 224, 230; 705/10, 14; 707/10

(56) References Cited

U.S. PATENT DOCUMENTS

| | | | | |
|---|---|---|---|---|
| 4,503,499 | A | 3/1985 | Mason et al. | 709/101 |
| 4,567,600 | A | 1/1986 | Massey et al. | 713/174 |
| 4,645,873 | A | 2/1987 | Chomet | 709/201 |
| 5,043,876 | A | 8/1991 | Terry | 707/201 |
| 5,089,954 | A | 2/1992 | Rago | 707/10 |
| 5,093,901 | A | 3/1992 | Cree et al. | 345/753 |
| 5,129,057 | A | 7/1992 | Strope et al. | 345/833 |
| 5,161,214 | A | 11/1992 | Addink et al. | 707/1 |
| 5,245,532 | A | 9/1993 | Mourier | 700/90 |

(List continued on next page.)

FOREIGN PATENT DOCUMENTS

| | | |
|---|---|---|
| EP | 0 739 115 A2 | 10/1996 |
| EP | 1 085 444 A2 | 3/2001 |

OTHER PUBLICATIONS

S. Dharap et al., "Multi–user distributed specification environments for Z," Technical report, Pennsylvania State University (1992), pp. 1–29.

S. Dharap et al., "The Specificator: A multi–user distributed specification environment," Technical report, Pennsylvania State University (1992), pp. 1–26.

S. Dharap, "Coordinating Concurrent Development in Distributed Environments," Ph.D. thesis, Pennsylvania State University Department of Computer Science (May, 1995), pp. 1–98.

(List continued on next page.)

*Primary Examiner*—Ayaz Sheikh
*Assistant Examiner*—Khanh Quang Dinh
(74) *Attorney, Agent, or Firm*—Hickman Palermo Truong & Becker LLP; Christopher J. Palermo

(57) ABSTRACT

A method and system are described that can be used to support making choices, such as in a schedule, invitation, or poll, among a group of participants connected to a network. A participant creates an electronic form specifying the subject matter of a choice topic and a list of network addresses corresponding to other choosing participants. A server receives the form and includes resources for delivering an electronic mail message associated with an electronic medium providing various choices. When the participant opens the message, an electronic medium is produced by the server that includes static and dynamic regions. The participant can input a choice using an interaction region. The dynamic regions are asynchronously updated in the server and indicate the current content of the electronic medium that can be accessed by other participants in the group.

48 Claims, 11 Drawing Sheets

U.S. PATENT DOCUMENTS

| | | | | | |
|---|---|---|---|---|---|
| 5,299,305 | A | | 3/1994 | Oomae et al. | 709/203 |
| 5,325,310 | A | | 6/1994 | Johnson et al. | 709/206 |
| 5,363,507 | A | | 11/1994 | Nakayama et al. | 345/743 |
| 5,377,354 | A | | 12/1994 | Scannell et al. | 709/103 |
| 5,392,400 | A | | 2/1995 | Berkowitz et al. | 709/203 |
| 5,408,470 | A | | 4/1995 | Rothrock et al. | 370/261 |
| 5,410,646 | A | | 4/1995 | Tondevold et al. | 707/507 |
| 5,428,784 | A | | 6/1995 | Cahill, Jr. | 709/206 |
| 5,535,332 | A | | 7/1996 | Ishida | 709/205 |
| 5,537,142 | A | | 7/1996 | Fenouil | 707/517 |
| 5,555,426 | A | | 9/1996 | Johnson et al. | 709/201 |
| 5,579,472 | A | | 11/1996 | Keyworth, II et al. | 709/203 |
| 5,592,626 | A | | 1/1997 | Papadimitriou et al. | 707/10 |
| 5,602,841 | A | | 2/1997 | Lebizay et al. | 370/413 |
| 5,608,872 | A | * | 3/1997 | Schwartz et al. | 709/205 |
| 5,615,269 | A | | 3/1997 | Micali | 379/93.12 |
| 5,617,539 | A | | 4/1997 | Ludwig et al. | 709/205 |
| 5,632,018 | A | | 5/1997 | Otorii | 709/200 |
| 5,647,002 | A | | 7/1997 | Brunson | 709/206 |
| 5,664,207 | A | | 9/1997 | Crumpler et al. | 707/201 |
| 5,687,317 | A | | 11/1997 | Hughes et al. | 709/605 |
| 5,689,642 | A | | 11/1997 | Harkins et al. | |
| 5,732,400 | A | | 3/1998 | Mandler et al. | 705/80 |
| 5,757,669 | A | | 5/1998 | Christie et al. | 709/205 |
| 5,781,732 | A | | 7/1998 | Adams | 709/205 |
| 5,790,677 | A | | 8/1998 | Fox et al. | 705/26 |
| 5,794,207 | A | | 8/1998 | Walker et al. | 705/78 |
| 5,796,396 | A | | 8/1998 | Rich | 345/741 |
| 5,799,191 | A | | 8/1998 | Moriyasu et al. | 709/203 |
| 5,799,320 | A | | 8/1998 | Klug | 707/201 |
| 5,819,092 | A | * | 10/1998 | Ferguson et al. | 709/201 |
| 5,819,274 | A | | 10/1998 | Jackson, Jr. | 707/10 |
| 5,821,925 | A | | 10/1998 | Carey et al. | 345/757 |
| 5,825,883 | A | | 10/1998 | Archibald et al. | 705/53 |
| 5,835,713 | A | | 11/1998 | Fitzpatrick et al. | 709/204 |
| 5,842,178 | A | | 11/1998 | Giovannoli | 705/26 |
| 5,848,396 | A | | 12/1998 | Gerace | 705/10 |
| 5,850,430 | A | | 12/1998 | Hamalainen | 379/93.02 |
| 5,850,517 | A | | 12/1998 | Verkler et al. | 709/202 |
| 5,855,020 | A | | 12/1998 | Kirsch | 707/10 |
| 5,872,924 | A | | 2/1999 | Nakayama et al. | 707/201 |
| 5,884,035 | A | | 3/1999 | Butman et al. | 709/218 |
| 5,884,325 | A | | 3/1999 | Bauer et al. | 707/201 |
| 5,897,622 | A | | 4/1999 | Blinn et al. | 705/26 |
| 5,909,689 | A | | 6/1999 | Van Ryzin | 707/203 |
| 5,911,045 | A | | 6/1999 | Leyba et al. | 709/204 |
| 5,913,040 | A | | 6/1999 | Rakavy et al. | 709/232 |
| 5,913,920 | A | | 6/1999 | Adams et al. | 709/204 |
| 5,918,054 | A | * | 6/1999 | Jury et al. | 709/222 |
| 5,923,848 | A | * | 7/1999 | Goodhand et al. | 709/219 |
| 5,930,471 | A | | 7/1999 | Milewski et al. | 709/204 |
| 5,933,811 | A | | 8/1999 | Angles et al. | 705/14 |
| 5,937,161 | A | | 8/1999 | Mulligan et al. | 709/206 |
| 5,944,785 | A | | 8/1999 | Prommier et al. | 709/205 |
| 5,945,989 | A | | 8/1999 | Freishtat et al. | 345/760 |
| 5,948,057 | A | | 9/1999 | Berger et al. | 709/205 |
| 5,948,070 | A | | 9/1999 | Fujita | 709/243 |
| 5,951,652 | A | * | 9/1999 | Ingrassia, Jr. et al. | 709/248 |
| 5,956,693 | A | | 9/1999 | Geerlings | 705/14 |
| 5,963,947 | A | | 10/1999 | Ford et al. | 707/10 |
| 5,966,512 | A | | 10/1999 | Bates et al. | 709/205 |
| 5,970,479 | A | | 10/1999 | Shepherd | 705/37 |
| 5,974,430 | A | * | 10/1999 | Mutschler et al. | 707/505 |
| 5,987,376 | A | | 11/1999 | Olson et al. | 701/201 |
| 5,995,096 | A | | 11/1999 | Kitahara et al. | 345/753 |
| 5,995,097 | A | | 11/1999 | Tokumine et al. | 345/752 |
| 6,006,200 | A | | 12/1999 | Boies et al. | 705/26 |
| 6,009,410 | A | | 12/1999 | LeMole et al. | 705/14 |
| 6,012,083 | A | | 1/2000 | Savitzky et al. | 709/202 |
| 6,012,090 | A | | 1/2000 | Chung et al. | 709/219 |
| 6,014,644 | A | | 1/2000 | Erickson | 705/80 |
| 6,023,686 | A | | 2/2000 | Brown | 705/37 |
| 6,041,308 | A | | 3/2000 | Walker et al. | 705/14 |
| 6,044,205 | A | | 3/2000 | Reed et al. | |
| 6,044,403 | A | | 3/2000 | Gerszberg et al. | 709/225 |
| 6,049,787 | A | | 4/2000 | Takahashi et al. | 705/44 |
| 6,055,519 | A | | 4/2000 | Kennedy et al. | 705/80 |
| 6,055,522 | A | * | 4/2000 | Krishna et al. | 705/517 |
| 6,084,883 | A | | 7/2000 | Norell et al. | 707/3 |
| 6,092,074 | A | | 7/2000 | Rodkin et al. | 707/102 |
| 6,115,384 | A | | 9/2000 | Parzych | 370/401 |
| 6,141,010 | A | * | 10/2000 | Hoyle | 345/356 |
| 6,144,991 | A | | 11/2000 | England | 709/205 |
| 6,151,621 | A | | 11/2000 | Colyer et al. | 709/204 |
| 6,155,840 | A | * | 12/2000 | Sallette | 434/323 |
| 6,161,149 | A | | 12/2000 | Achacoso et al. | 710/4 |
| 6,182,052 | B1 | * | 1/2001 | Fulton et al. | 705/26 |
| 6,205,478 | B1 | | 3/2001 | Sugano et al. | 709/223 |
| 6,226,670 | B1 | | 5/2001 | Ueno et al. | 709/207 |
| 6,260,124 | B1 | | 7/2001 | Crockett et al. | 711/162 |
| 6,317,777 | B1 | | 11/2001 | Skarbo et al. | 709/204 |
| 6,336,134 | B1 | | 1/2002 | Varma | 709/205 |
| 6,338,086 | B1 | | 1/2002 | Curtis et al. | 709/218 |

OTHER PUBLICATIONS

Goldberg et al., *Active Mail–A Framework for Implementing Groupware* CSWC Proceedings Nov. 1992: 75–83.

Brothers et al., *Supporting Informal Communication Via Ephemeral Interest Groups* CSWC Proceedings Nov. 1992: 84–90.

Borenstein, Nathaniel S., *Computational Mail as Network Infrastructure for Computer–Supported Cooperative Work* CSWC Proceedings Nov. 1992: 67–74.

* cited by examiner

| beta Schedule Zaplet | Code Walk-thru |

701 { ▸Sent by: Beth Stearns | Thursday, December 2, 1999 1:52:40 PM PST
    { View this Zaplet on the Web  Send A Schedule Zaplet  More Zaplets...

Background Information
Code walk-through for the bata 2 release

① Submit Your Schedule Preferences

▸1. Tell the group your scheduling preferences by indicating your availability for each time. The blue choice is the author's preferred.

702

|  | Yes | No | Maybe |
|---|---|---|---|
| Friday, 12/3/99, 3 pm | ⊘ | O | O |
| tomorrow, 11 am | ⊘ | O | O |
| Monday, 2 pm | O | O | ⊙ |

723 — 720 720 720

▸2. Please enter some personal information so we can keep track of your response:

Your Name: 704
Your e-mail: 705
Comments (optional): 706

703

[Submit] [Reset]
  707    708

② Please Review Schedule Info

| Current Results | Friday, 12/3/99, 3 pm | tomorrow, 11 am | Monday, 2 pm |
|---|---|---|---|
| No schedules have been submited yet. 715 | | | |

Chart made at Dec 2, 1999 2:10 PM

Comments
No comments have been received yet.  716

③ Share This Schedule with Others

Forward to: 711

Forward Zaplet
712

700

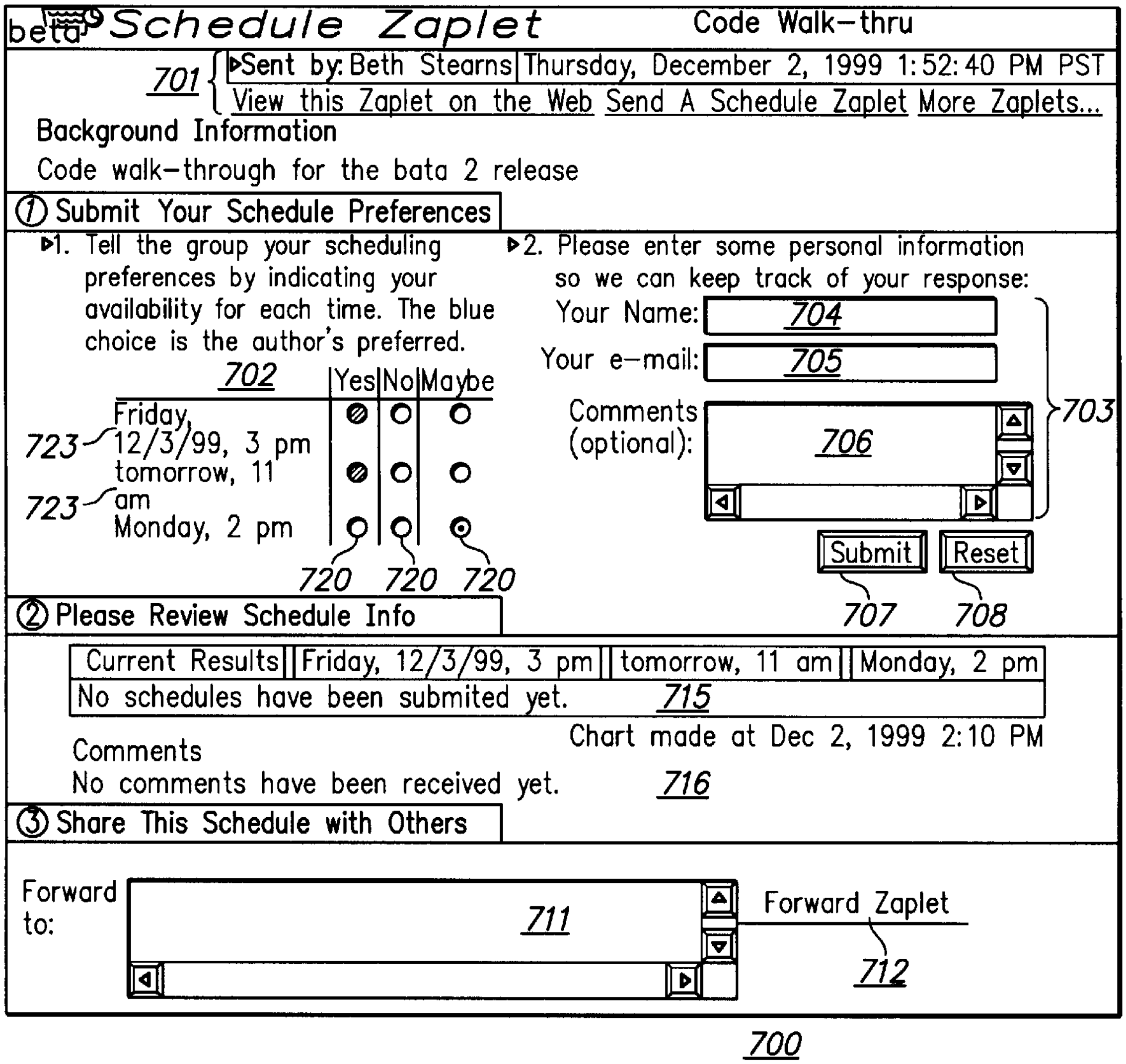

FIG. 9

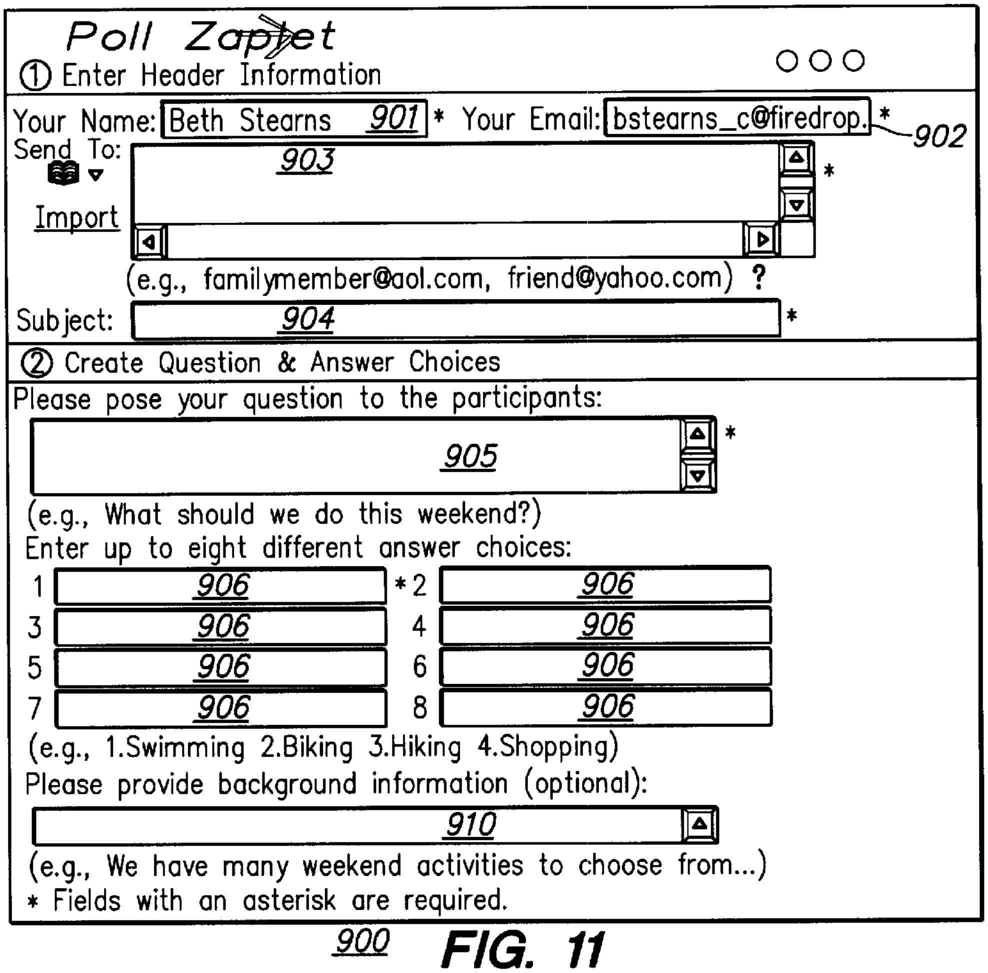

FIG. 11

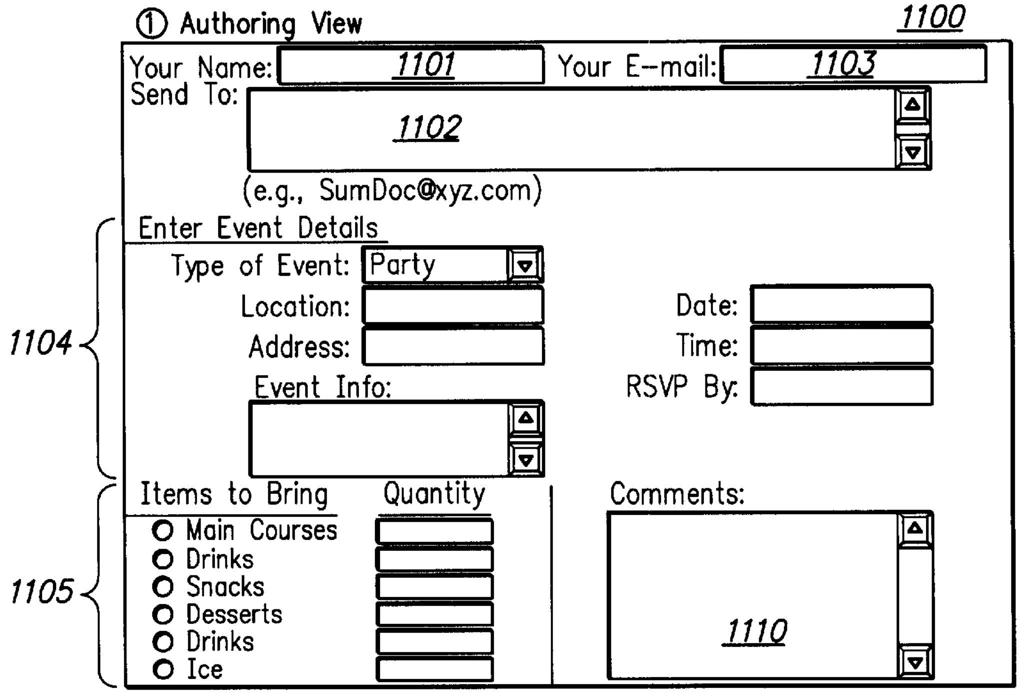

FIG. 14

*Poll Zappet*  ○ ○ ○
① Enter Header Information
Your Name: [Beth Stearns  *901*] * Your Email: [bstearns_c@firedrop.] * ~902
Send To: [    *903*    ] *
Import
(e.g., familymember@aol.com, friend@yahoo.com) ?
Subject: [    *904*    ] *

② Create Question & Answer Choices
Please pose your question to the participants:
[    *905*    ] *
(e.g., What should we do this weekend?)
Enter up to eight different answer choices:
1 [ *906* ]  *2 [ *906* ]
3 [ *906* ]   4 [ *906* ]
5 [ *906* ]   6 [ *906* ]
7 [ *906* ]   8 [ *906* ]
(e.g., 1.Swimming 2.Biking 3.Hiking 4.Shopping)
Please provide background information (optional):
[    *910*    ]
(e.g., We have many weekend activities to choose from...)
* Fields with an asterisk are required.

*900*  FIG. 11

① Authoring View    *1100*
Your Name: [ *1101* ]  Your E-mail: [ *1103* ]
Send To: [    *1102*    ]
(e.g., SumDoc@xyz.com)

Enter Event Details
  Type of Event: [Party ▼]
  Location: [    ]       Date: [    ]
  Address: [    ]        Time: [    ]
  Event Info: [    ]     RSVP By: [    ]

*1104*

Items to Bring   Quantity        Comments:
  ○ Main Courses  [    ]
  ○ Drinks        [    ]
  ○ Snacks        [    ]
  ○ Desserts      [    ]          [ *1110* ]
  ○ Drinks        [    ]
  ○ Ice           [    ]

*1105*

| beta *Decision Zaplet* | Weekend activity |

1001 { ▷Sent by: Beth Stearns | Thursday, December 2, 1999 3:34:10 PM PST
{ View this Zaplet on the Web   Send A Poll Zaplet   More Zaplets...

Background Information
Why don't we try the opera for a change?
*1015*

① Submit Your Decision Preferences

▷1. Let's do something different      ▷2. Please enter some personal information
   this weekend.                          so we can keep track of your response:

○ Hiking    *1002*              Your Name: [Beth Stearns  *1004*]
   ○ Skiing                         Your e-mail: [           *1005*]
   ○ Gambling
   ○ Go to opera                    Comments    [The opera sounds    ]  }*1003*
   *1023*                           (optional): [like fun.    *1006*  ]

*1007*  [Submit] [Reset] *1008*

② Review Decision Status ( No votes )    ⊘ Hiking (0)
  ( received yet. )  ○ Skiing (0)        *1009*
                  ○ Gambling (0)
                  ⊘ Go to opera (0)

Chart made at Dec 2, 1999 3:34 PM

Comments
No comments have been received yet.    *1010*

③ Share This Decision with Others

Forward
to:                         *1014*              Forward Zaplet
                                                    \
                                                    *1015*

*1000*

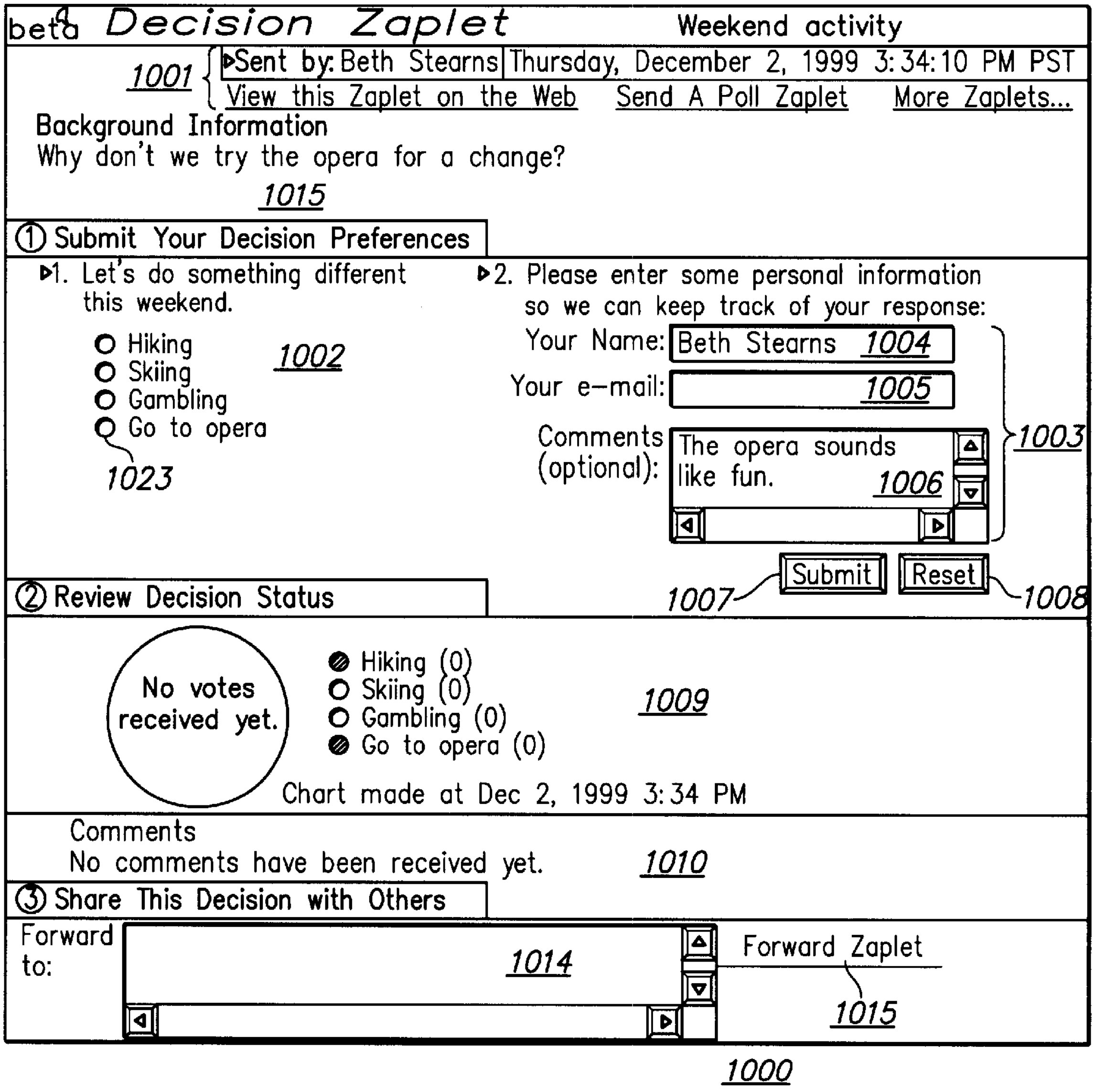

FIG. 12

SYSTEM AND METHOD FOR GROUP CHOICE MAKING

PROVISIONAL APPLICATION DATA

The present invention claims priority to United States Provisional Patent Application No. 60/151,650, filed Aug. 31, 1999 and No. 60/151,476, filed Aug. 30, 1999, both entitled SYSTEMS AND METHODS FOR MESSAGING WITH DYNAMIC CONTENT, naming inventors Michael Hanson, Graham Miller, and Brian Axe, and is incorporated by reference as if fully set forth herein.

CROSS-REFERENCE TO RELATED APPLICATIONS

The present application is a continuation-in-part application of co-pending U.S. patent application Ser. No. 09/427,152 entitled METHOD FOR COMMUNICATING INFORMATION AMONG A GROUP OF PARTICIPANTS, filed Oct. 25, 1999; Ser. No. 09/426,648 entitled SYSTEM FOR COMMUNICATING INFORMATION AMONG A GROUP OF PARTICIPANTS, filed Oct. 25, 1999; and Ser. No. 09/427,378 entitled ELECTRONIC MEDIA FOR COMMUNICATING INFORMATION AMONG A GROUP OF PARTICIPANTS, filed Oct. 25, 1999; invented by Michael Hanson, Graham Miller, and Brian Axe; and such applications are incorporated by reference herein as if fully set forth herein.

The present application is also related to co-pending application Ser. No. 09/483,508 entitled METHOD AND SYSTEM FOR PROCESS INTERACTION AMONG A GROUP, filed on the same day as the subject application; and Ser. No. 09/483,221 entitled METHOD AND SYSTEM FOR GROUP CONTENT COLLABORATION, filed on the same day as the subject application; invented by Michael Hanson, Graham Miller, Brian Axe, and Steve Evans; and such applications are incorporated by referenced as if fully set forth herein.

TECHNICAL FIELD

The present invention relates generally to communication networks, and more particularly, to a system and method for making choices among a group of participants connected to such networks using a dynamic distribution of data.

BACKGROUND OF THE INVENTION

Many group choice tools are known that allow participants in a group to make choices in a choice making process. For example, participants can be polled to determine how they may vote in a particular election.

One type of group choice tool uses store and forward technology. Initially, a message is sent to participants who are expected to respond to the message with their choices. The participants can then read or respond to the message. Once the sender of the message receives a choice response from some or all of the participants, the sender may send a subsequent message back to the participants indicating the results of the choice making process.

This type of group choice tool has several drawbacks. The results of the choice making process are not immediately available to any of the participants in any aggregated form. This prevents participants from making the best possible choices based on feedback from any of the prior responding participants. Further, each participant may send responses back to the sender of the message in varying formats. This can make aggregating or summarizing the results of the choice making process difficult. Finally, there is no aggregated immediate feedback to a participant as to how his or her input affects the choice making process. Ultimately, the participants are prevented from having a complete picture of a current state of the choice making process.

Another type of group choice tool is real time conferencing. In this case, an electronic forum is established in which participants can exchange ideas, often with the goal of making a choice. In this operating regime, participants are forced to focus their attention and continually make choices. For example, many participants may participate in a telephone conference, video conference, or electronic conference system.

This type of group choice tool suffers from certain drawbacks. One drawback is that real time conferencing requires participants to interact at the same time. This may be unduly burdensome and may be inconvenient to some or all of the participants. Further, real time conferencing typically operates in a proprietary environment. This means that each participant must match-up with complimentary services to participate in the conference. This can require increased cost and additional navigation for and set-up of non-proprietary participants. Additionally, participants may not be able to effectively communicate when the group becomes too large.

Therefore, a need exists for a system and method for making choices that is easily accessible by a desiring participant, can support a large number of participants, and provides a participant with an aggregated state of the choice making process.

SUMMARY OF THE INVENTION

In general, the present invention is directed to a method and system for making choices among a group of participants using an electronic medium having dynamic content stored in the server. The dynamic content includes choices to be selected by the participants and the dynamic content is asynchronously dynamically update or dynamically retrieved in response to an open action by at least one of the participants. In this way, the preferred method and system causes the dynamic content in the electronic medium to be current when read or accessed by any of the participants.

Accordingly, in one aspect, the present invention is directed to a system for making choices among a group of participants that includes a server having an associated database and adapted to be used in the network. The server generates and sends an electronic message to the participants, and the server generates and sends an electronic medium stored in the database to at least one of the participants in response to a first open action by the at least one participant of the electronic message. The electronic medium contains choices to be selected. The electronic medium also includes an interface for communicating input associated with the choices from the participants, and a plurality of dynamic content regions in the electronic medium. Each of the dynamic content regions includes dynamic content. The network system also includes logic in communication with the database to asynchronously dynamically update and dynamically retrieve the dynamic content of the electronic medium stored in the database. Each of the dynamic content regions are updated with the dynamic content. The dynamic content includes at least one of the selected choices.

Implementations of the invention include one or more of the following. The choices may include a schedule, a poll, a survey, an election, RSVP, task allocation, wish lists, donation confirmation, approval, recruitment vote, group seating selection, game next move selection, sporting event pool, payment authorization, purchase selection, and purchase authorization. The dynamic content may include graphics representative of the selected choices. The system may include an external source in data communication with the server to deliver content to the dynamic content regions. The electronic medium may include a forwarding region that can be used to increase the number of participants. The network system may be adapted to support an Internet or an electronic mail protocol.

In another aspect, the present invention is directed to a group choice tool that includes a server having a database and adapted to receive an electronic form. The electronic form includes a network address associated with each participant in a group and choices to be selected. An electronic message may be sent to each network address. The electronic message may be parsed, and an electronic medium is sent to the network address of at least one participant in the group in response to a first open action by the at least one participant. The electronic medium is asynchronously dynamically updated and dynamically retrieved by the server and includes dynamic content. The electronic medium includes dynamic content regions that are updated with the dynamic content, which includes one of the choices to be selected.

In another aspect, the present invention is directed to a method for making choices among a group of participants. The method includes generating an electronic form having a plurality of network addresses associated with the participants and choices to be selected, and sending the electronic form to a server. The electronic message may be parsed by at least one of the participants receiving the electronic message from the server in response to an open action by the at least one participant. The method also includes serving an electronic medium having dynamic content regions in response to the open action. The electronic medium may be stored in the server and the dynamic content regions may include a then current dynamic content representative of the selected choices. The dynamic content may be asynchronously dynamically updated and dynamically retrieved from the server, and the dynamic content may include a selection of one of the choices by any of the participants.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 9 is an example of an image of a zaplet for scheduling among a group of participants.

FIG. 11 is an example of an electronic form for initiating a zaplet for a poll among a group of participants.

FIG. 12 is an example of an image of a zaplet for polling a group of participants.

FIG. 14 is an example of an electronic form for initiating an invitation.

DESCRIPTION OF THE PREFERRED EMBODIMENTS

Figure 1:
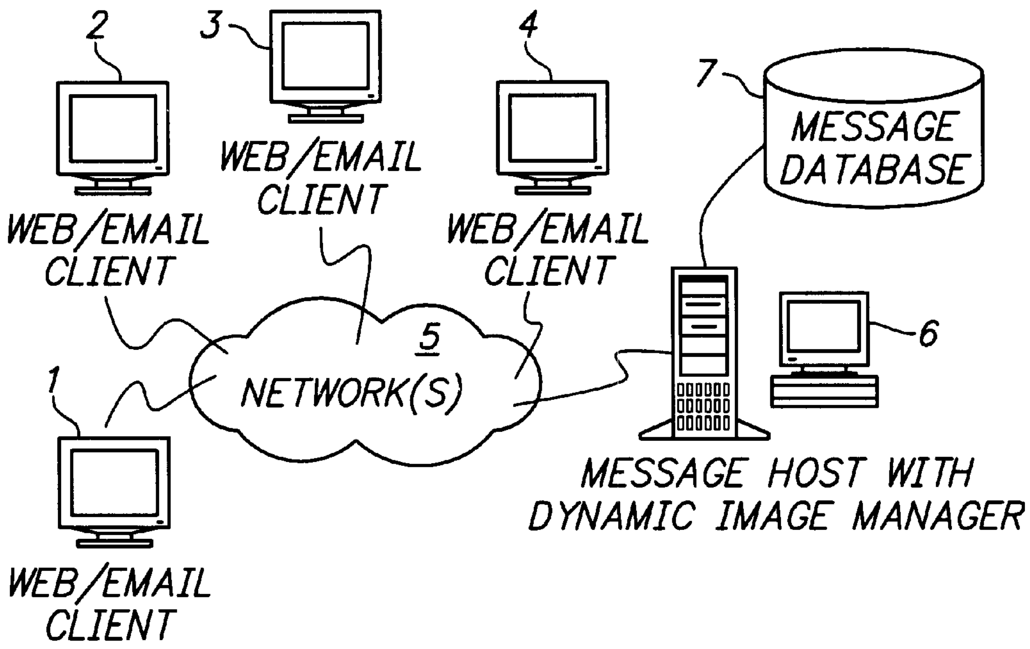
FIG. 1 is a simplified diagram of a sample network including participants of a group connected to the network.

In general, the present invention is directed to a method and system for communicating and collaborating among participants in a group. The method uses an electronic medium having at least one dynamic content region that is stored in a database of a server. Input composed by the participants of the group or other external sources is accepted by the server to update the dynamic content region of the electronic medium in the server. The updating of the dynamic content region is preferably performed asynchronously relative to the sending and receiving of the input from any of the participants or external sources. In this way, the content of the electronic medium is always current.

The invention is based on a principle different from known communication systems i.e. the information communicated between participants of the group is not current when sent by any participant, but current when accessed or read by a participant. The method and system of the invention does not merely rely on sending information that was current when the medium was sent to a receiving participant to communicate information; rather, the current content from the server of the electronic medium is retrieved, when the receiving participant accesses the electronic medium. This means that multiple virtual instances of the electronic medium can be reduced to a single thread. The method and system usefully reduces the amount of media, such as electronic mail messages carrying redundant static content that is communicated among the participants of the group. This invention also makes collaboration of information more rapid and interactive among participants of the group.

The electronic medium can also be updated by a variety of external sources, such as by an attached server containing stock quotes or news feeds. In this way, the electronic medium can be used to supply different types of information to the participant in a fast, efficient, and flexible manner.

A suitable system for the invention is a communication network that is configured with participants that support a variety of protocols, such as those for supporting electronic mail ("e-mail") and the Internet. The electronic media for communicating information and that supports collaboration among participants in a group connected to the network will be referred to as a "zaplet". The zaplet contains static content and dynamic content regions. The term dynamic content can be defined as regions of the zaplet that are retrieved from the server, when the zaplet is accessed by a participant or external source. The term static content can be defined as regions of the zaplet that are not retrieved at the time the zaplet is accessed by a participant or external source. The dynamic content of the zaplet can be changed and updated by the participants in the group or by other external sources, such as an external server containing the most recent news feeds or stock quotes. The content of the zaplet can be stored in a database in a server of the network. The zaplet is also customizable and programmable, containing various text and graphical regions to execute a variety of functions and applications. Preferably, each of the regions may be configured by the participants or the server in the network. When a participant performs an open action to access the zaplet, the zaplet may open and the server serves and displays the then current content in the database to a participant.

An "open action" can be defined as an action by any of the participants or the server that causes the static and/or the dynamic content of the zaplet to be retrieved from the server. For example, an open action may occur when a user invokes the File Open command from a menu bar within an email reading program while an email message containing a zaplet is selected. Alternatively, the server could perform an open action using, for example, push technology processes.

The term collaboration can be defined as an activity in which one or more participants or services share information or points-of-view with an intent of reaching a decision, making a choice, conducting a financial transaction, or sharing knowledge.

The dynamic content can be represented in a dynamic content region in the zaplet, and includes text or images, such as rich text HTML, based on mark-up languages or image construction languages. Consequently, the zaplet can supply all the look and feel possibilities of the World Wide Web ("Web"), and also the participants can experience interactions and collaborate with each other with increased efficiently than in known e-mail systems.

The system and method of the invention makes communication among a group of participants simple. Preferably, the server used to generate and manage the zaplet is scalable for a particular implementation. Its scalability allows quick user response under heavy load conditions on the server. Further, the zaplet can be easily accessed by the participant, such as from a desktop computer. Accordingly, the participant will have constant access to his or her zaplet at all times, and thereby can collaborate with other participants in the group quickly, simply, and efficiently. This means that the participant needs not repeatedly type-in the universal resource locator ("URL") of a portal web site to regain access to a particular application, such as a discussion; the zaplet may be easily accessible and open in an unobtrusive manner.

Unless otherwise defined, all technical and scientific terms used herein have substantially the same meaning as commonly understood by one of ordinary skill in the art to which the invention belongs. Although many methods and systems similar or equivalent to those described herein can be used in the practice of the present invention, suitable methods and systems are described below. Additionally, the methods, systems, and examples described herein are illustrative only and not intended to be limiting.

Other features and advantages of the invention will be apparent from the following detailed description, the drawings, and from the claims.

FIG. 1 illustrates a plurality of participants 1, 2, 3, and 4 of a group that are coupled to a network 5. Any number of participants may be connected to the network 5. The term participant can be defined as an entity or system that is capable of performing or executing a variety of functions on the zaplet as described herein. For simplicity, however, the following description will be made to participants 1–4. Each of the participants 1–4 may include any specific or general computer system that is equipped to receive or read e-mail messages using standard e-mail protocols, such as the Simple Mail Transfer Protocol (SMTP) and the Multipurpose Internet Mail Extensions (MIME), or navigate the Web. The computer may be, for example, a personal computer ("P.C."), an Apple Macintosh, a Unix workstation, or other computing machine that runs a windows-based operating system. A suitable computer may also include a modem, a monitor, a keyboard, a mouse, system software including support for TCP/IP communication, and browser software. Alternatively, the participants 1–4 may include other devices that are capable of transmitting or receiving e-mail messages, forms, or zaplets, such as Palm computers provided by 3Com Corporation, Windows CE-based devices, messaging enabled cellular telephones, pagers, television set top boxes, e.g., Web T.V., or portable computers. The participants 1–4 may further include other devices that are capable of processing text or voice messaging.

The network 5 may be any local or global computer network. For example, the network 5 may be the Internet, a telephone network, a wireless communications network, a satellite communications network, or other similar data networks.

For simplicity, the following description will be made using a system and method configured to support any of the below listed e-mail protocols and data structures. However, the invention can be configured and practiced in any of the above communication networks. For example, voicemail using interactive voice systems could be configured to provide voice messages as current when heard dynamic content.

Each of the participants 1–4 is configured to support a variety of e-mail protocols and mark-up languages, such as SMTP, MIME, Hypertext Mark-up Language ("HTML"), Extensible Mark-up Language ("XML"), Standardized Generalized Mark-up Language ("SGML"), or similar e-mail protocols and/or mark-up languages.

FIG. 1 also shows a server 6 that is connected to the network 5. The server 6 is preferably configured to manage the dynamic content, routing, and updating of electronic forms, messages, or zaplets among the participants 1–4. The server 6 is connected to a message database 7 that is used to manage the dynamic content of zaplets in accordance with the present invention. Other data management resources may also be used.

Figure 2:
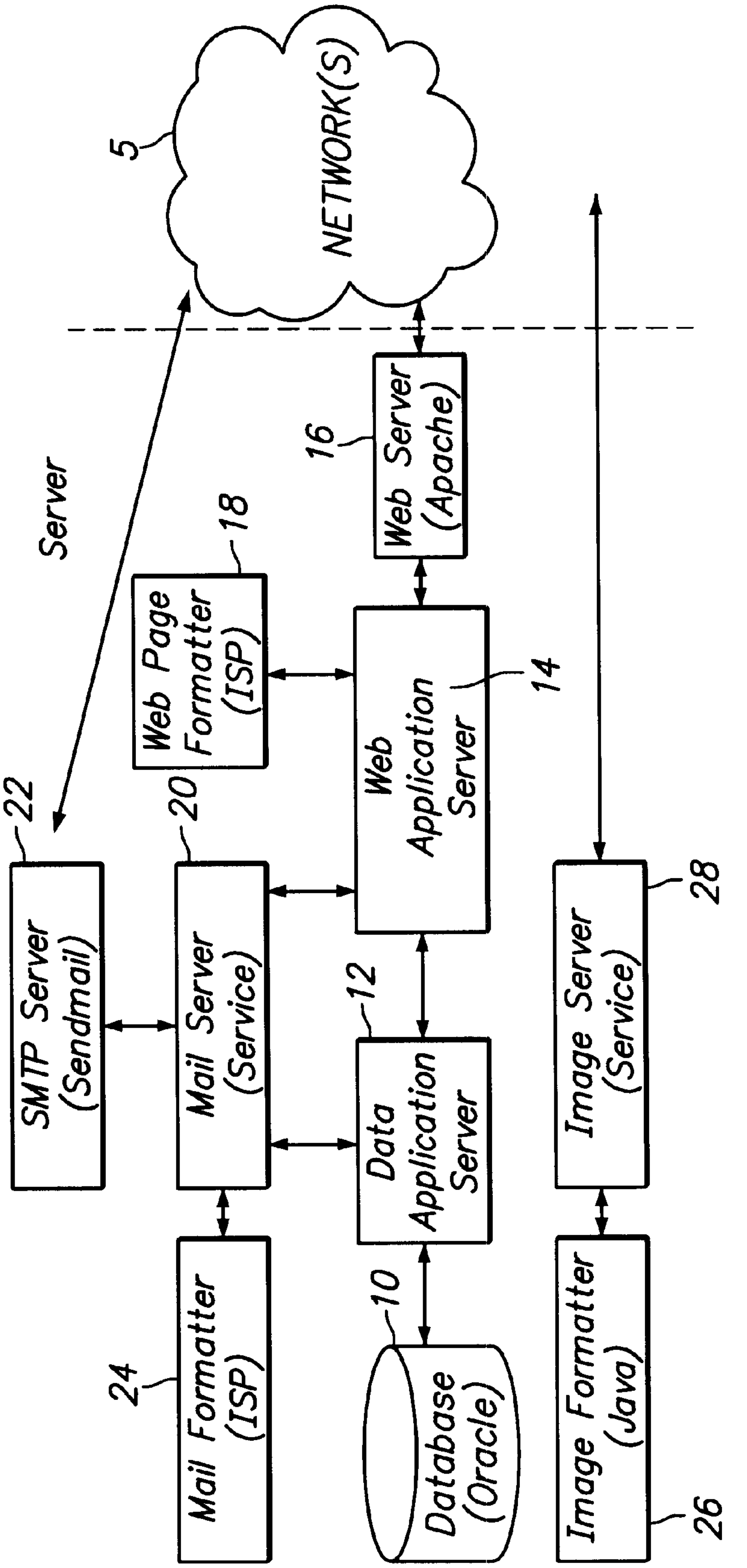
FIG. 2 illustrates a schematic diagram showing data flows of functional components of the network of FIG. 1.

FIG. 2 illustrates a simplified block diagram showing data flows of various functional components of the server 6. The server 6 includes a database 10. The database 10 may be a relational database, such as commercially available from Oracle. The database 10 may include multiple physical databases and may be implemented at a single site or distributed among many sites. The database 10 may also be implemented using object-oriented databases, object-relational databases, or hierarchical file structures.

The database 10 may include information that is specific to any participant or electronic form, message, or zaplet. Contents of the database 10 may include demographic data, participant credit card and payment information, participant preference information, generic form, message, or zaplet information, such as recipients or senders of the group, subject identifiers, or message specific information, and usage statistics for the electronic forms, messages, and zaplets and/or a web site. The database 10 may also store electronic forms that act as blanks for the creation of the zaplets. The database 10 may also include images and web pages used in the creation of the zaplets and also used in the presentation of any dynamic region of the zaplet. The database 10 may also maintain a record of the history of changes that have been made to any dynamic content region of the zaplet discussed below. This record may also be propagated along with any dynamic content to one of the participants parsing the electronic message and zaplet, as discussed below. An example configuration for storing and processing various content in the database 10 is illustrated in the attached Appendix A, which is herein incorporated by reference.

FIG. 2 also shows a data application server 12 is coupled to the database 10. The server 12 is configured with, for example, a set of Java classes or any other high level programming language built using, for example, an Enhydra application server or any of a variety of other tools for object-relational translation. The data application server 12 is used for translating the content in the database 10 into Java objects, for use by a web application server 14. The data application server 12 may also be configured to cache some data to reduce the load on the database 10.

A web server 16 is included in the server 6 to connect to the participants 1–4. The web server 16 is connected to the web application server 14 and can be any commercially available web server, such as an Apache server. The web server 16 is configured to manage requests from browsers at the participants 1–4, to manage session information, to send and receive forms, or zaplets transmitted to or from the participants 1–4, and to serve HTML data and static images to the participants 1–4.

The web application server 14 can be configured using a set of Java classes built-on top of the data application server 12. The web application server 14 is responsible for executing business logic associated with the electronic forms, messages, and zaplets. For example, the web application server 14 may manage message, form, and zaplet manipulation, deadlocks in the network 5, generate a URL and content associated with a specific zaplet or form, format the zaplet, message, or form, handle message authorizing, and handle participant record editing and participant interaction with various zaplets, forms, and messages.

A web page formatter 18 is connected to the web application server 14. The web page formatter 18 is used to handle the basic styles and layouts of various components of the zaplets, messages, or forms. Further details of the preferred business logic configured in pseudocode executable by the system and describing the method of the present invention for initiating, sending, updating and displaying the zaplet, forms, and messages can be found in attached Appendix A.

The web page formatter 18 may be configured to operate using a Java Server Page ("JSP") construct.

FIG. 2 also shows that the server 6 includes a mail server 20 coupled to the web application server 14 and the data application server 12. The mail server 20 handles the operations of the e-mail protocol necessary to support a variety of zaplets, forms, and messages. For a given message, form, or zaplet, the mail server 20 retrieves data associated with the medium from the data application server 12, and from any operations of the business logic of the web application server 14. The mail server 20 then formats the static content for the medium utilizing an associated mail formatter 24 including a command to retrieve the dynamic content. The mail formatter 24 includes operations that can be used for the basic styles and layouts of the common elements of the zaplets, forms, or messages. Once the mail server 20 has compiled the required information from the data application server 12 and web application server 14, the mail server 20 may attach necessary header information to the zaplet, form, or message. For example, the header information may make an e-mail message compliant with the MIME standard. The mail server 20 then transmits the produced message to a mail transport server 22. The mail transport server 22 routes the message through the network 5. The mail server 20 may also be configured to manage bounced and undelivered messages, forms, or zaplets, and also alert the appropriate participants of these conditions. The mail server 20 may also communicate with the web application server to validate the addresses of the various participants. The mail server 20 may also receive responses via the interaction region 225 discussed below from any participant who is not connected to the network 10 or "off-line" when reading the zaplet. In this configuration, the participant can send input back to the server 6 to be dynamically updated, after he or she is re-connected to the network 10. In this way, the participant can contribute to a zaplet even in the absence of the dynamic content and without having to get back to the zaplet when connected "on-line".

The mail formatter 24 may be implemented using a JSP construct.

The mail transport server 22 may use SMTP, and can be implemented using a number of commercially available or open source e-mail servers, including Sendmail and the Exchange server.

The server 6 also includes an image server 28 that is used for connection to the participants 1–4. An image formatter 26 is connected to the image server 28. The image server 28 may be implemented using a web server (servlet). The image server 28 takes information from Hypertext Transfer Protocol ("HTTP") requests from the participants 1–4 and translates the information using predefined schemes into human viewable images that are encoded in a format compatible with known web browsers. The image server 28 may be configured separately from the web server 16, as shown in FIG. 2. This configuration may increase the scalability of the server 6. Alternatively, the web server 16 and the image server 28 can be configured together. The image formatter 28 may be configured using a Java construct. The image formatter 28 formats the image into a compliant standard, such as Graphical Interchange Format ("GIF"), Joint Photographics Experts Group ("JPEG"), or Portable Network Graphics ("PNG"), for the participants 1–4.

Figure 3:
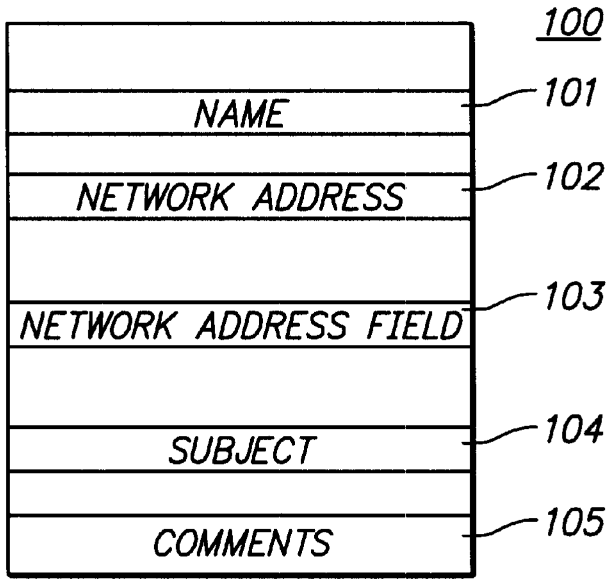
FIG. 3 illustrates an example electronic form to initiate a zaplet.

FIG. 3 illustrates an exemplary electronic form 100 that can be used to compose and initiate a zaplet among the participants 1–4 in accordance with the invention. The electronic form may be, for example, an HTML form. The electronic form 100 can be accessed via a web site sent by the server 6 to the participants 1–4, or may reside as a template at the participants 1–4.

The electronic form 100 can be stored in database 10, reside on a device of a participant, such as in a memory of a computer, or can be sent to a participant via a communications protocol, such as e-mail. The electronic form 100 may be blank or partially completed. To partially complete the form, the server 6 may contain prior knowledge of the use of the form using, for example, "cookies" or other suitable techniques.

The electronic form 100 includes a name field 101 that specifies the creating participant's name and a network address field 102 that specifies a specific address associated with the creating participant, such as an e-mail address. The electronic form 100 can also include a network address field 103 that includes network addresses of the participants that should receive the zaplet. The list of network addresses in the field 103 may include the network address of the creating participant. The list of network addresses may be explicitly inputted by the creating participant using a keyboard, imported from a folder or other file residing at the creating participant, or imported by the creating participant from a peripheral device, such as a Palm Pilot provided by 3Com. Alternatively, the creating participant can provide the list of network addresses to the server 6. In this configuration, the server 6 may input the list of network addresses into the field 103, when the creating participant accesses the electronic form 100, as described below. This means that the field 103 will be completed for the creating participant, when the electronic form 100 is accessed. At this stage, the creating participant may add or delete network addresses from the list provided by the server 6.

The electronic form 100 may also include a subject field 104 and any number of question, choice or comment fields 105. The creating participant may describe the subject matter of the zaplet in the subject filed 104 and supply details regarding the zaplet, in the comment field 105. In one configuration, each of the fields 101, 102, 103, 104, and 105 are part of a static region. The electronic form 100 may also include other applicable fields, such as for a title of the zaplet, fields for soliciting information from the participant, such as his/her address, links to other zaplets, a description field to receive an input, such as a URL, an image or binary data field, or option fields to specify choices, such as a poll choice.

The electronic form 100 can be used to initiate a variety of zaplets for different applications, which are herein referred to as "zaplet processes". Once the electronic form 100 is created, it is sent to the server 6. The server 6 then sends an e-mail message to the participants listed in the network address field 103 to notify the receiving participants that a zaplet process has been initiated. The e-mail message is opened and parsed, and the zaplet is essentially immediately accessed from the server 6 as described below.

Figure 4:
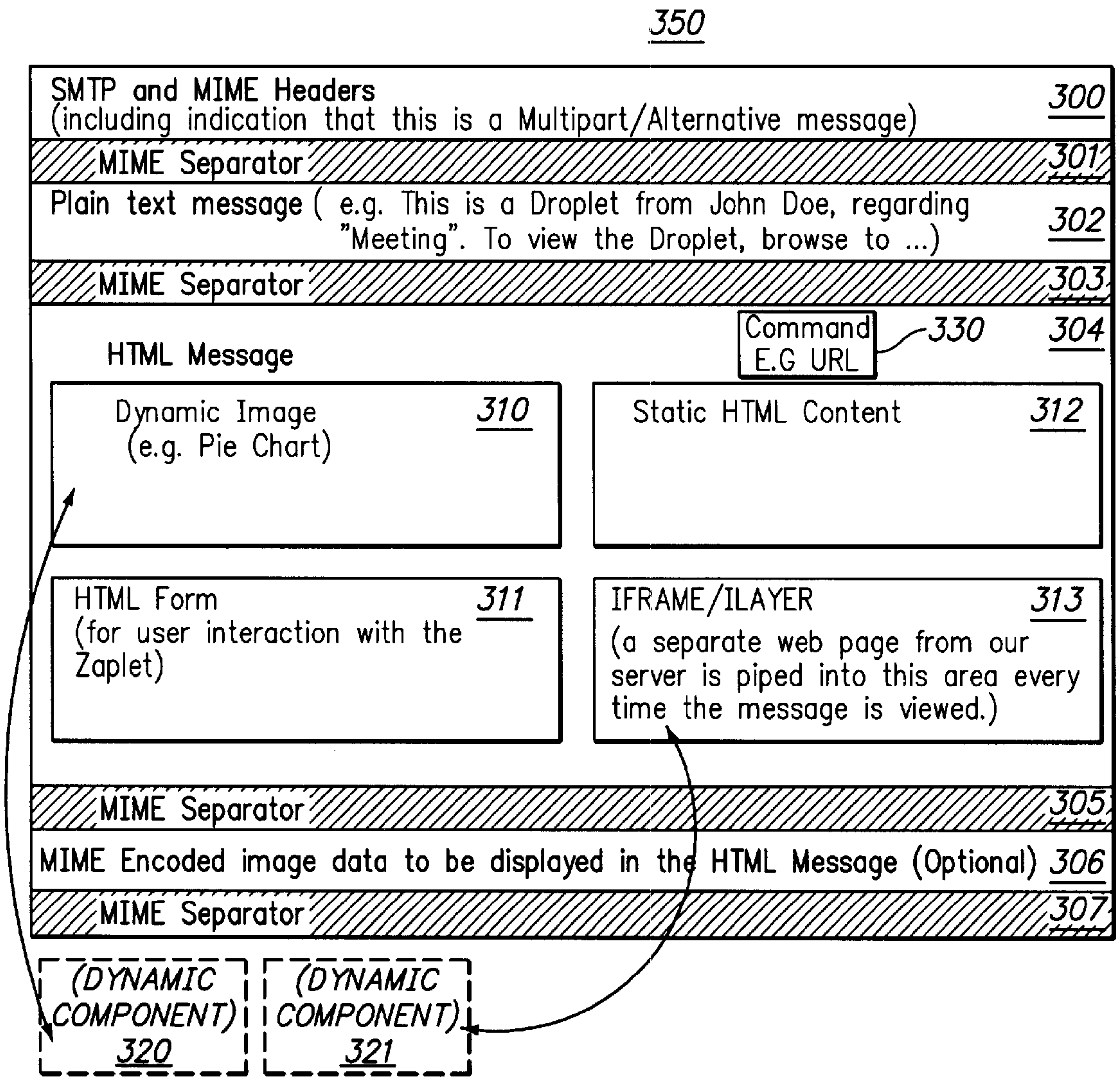
FIG. 4 is a diagram of a data structure for the zaplet having dynamic content.

FIG. 4 shows a suitable data structure for a zaplet process in accordance with the invention.

The data structure 350 can be based, for example, on HTML over SMTP using MIME. The data structure 200 includes SMTP and MIME headers 300. These headers 300 include an indication that the message is a multipart/alternative type according to the MIME standard. The multipart/alternative type specifies that the participant is configured to display one alternative format or content-type of the message selected from a segment 302 and a segment 304, depending on the capability of the software of the participant parsing the message.

The data structure 350 may define a transport envelope with region 300 containing a plurality of network addresses, such as the e-mail address of a sending and receiving participant.

A MIME separator 301 may be inserted between headers 300 and segments 302 and also between segments 302 and 304.

The segment 302 may also include a plain text message that is displayed if the participant does not have the capability to display regions 310 and 313 of segment 304, described below, according to the multipart/alternative message type indicated in the headers 300. For example, the segment 302 can include a command instructing a participant that he or she may view a web page corresponding to the segment 304.

The segment 304 may include a rich text HTML document, including any number of dynamic regions 310, HTML forms 311, static HTML content regions 312, and IFRAME/ILAYER regions 313. The dynamic content region 310 can include a command to dynamic content 320 of the zaplet, stored remotely such as in the database 10 of the server 6 on the network 5. The IFRAME/ILAYER region 313 may include a command to access dynamic content 321 of the zaplet, stored remotely such as in the database 10 or at the server 6 on the network 5. The dynamic content 321 may be in the same location as the first dynamic content 320, or may be in a different location in database 10. Each dynamic content region 310 and 313 may have content that includes more than one dynamically updated construct or image.

The form 311 can be used to receive input from a participant, and the region 312 can be used to provide static information/processes that are independent of the current zaplet process.

The segment 304 may also include a region 330 that can be used to store a command indicating a web page storing the content of the segment 304. This configuration can be used when a participant attempts to forward the zaplet to another participant connected to a server that cannot support the segment 304. In this way, the participant can still view the content of segment 304, and is therefore not dropped from the group.

In FIG. 4, a MIME separator 305 is configured between the segment 304 and a segment 306.

The segment 306 can include MIME encoded image data to be displayed in the HTML message of segment 304. The image data may include images for logos or photos that can be accessed by the participant even if the server 6 is not accessible. The optional segment 306 is followed by a MIME separator 307.

The present inventors have discovered that the structure 350 can be used to provide a high quality of service to various classes of participants based upon their e-mail client application capabilities. Five classes of "e-mail clients" include new P.C. e-mail clients, web e-mail clients, older P.C. e-mail clients, text e-mail clients, and America On-Line ("AOL") e-mail clients. The functionality in the segment 304 is provided to new P.C. e-mail clients completely. Some web e-mail clients do not allow use of an IFRAME/ILAYER tag to display dynamic content 321 of the dynamic content region 313. In this case, the participant gets a static message directing the participant to a web representation, or a dynamic image displaying the same up-to-date data is served by the image server 28. Many older P.C. e-mail clients, and all of the text e-mail clients cannot display the segment 304. These participants may receive an e-mail message with static content, and a URL identifying a web page at which the dynamic content may be accessed. Current AOL clients support some of the HTML standard.

It has also been found that the server 6 can be configured to identify the capability of a participant. For example, the server 6 can be configured to automatically send the zaplet to the participant by recognizing the suffix "aol.com" in the participant's network address. Alternatively, the participant can specify which e-mail client to use by sending a request to the server 6.

Figure 5:
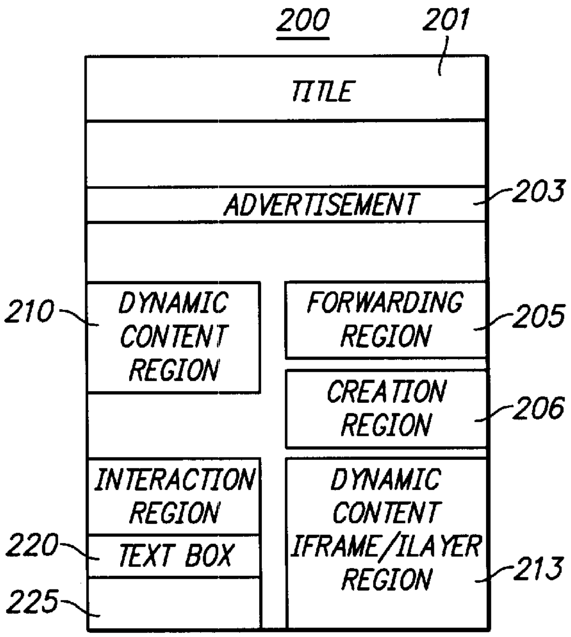
FIG. 5 is an example of an image of a zaplet.

FIG. 5 shows an example of an image of a zaplet 200 that is displayed to a user when the data structure 350 is parsed. The zaplet may include a title field 201 that contains static content similar to the information inputted in fields 101, 102, 104, and 105. Preferably, the above static content is displayed each time the zaplet 200 is accessed by a participant. The zaplet 200 may also include an advertising region 203. The content in region 203 can be static or dynamic content. The content in regions 201 and 203 can be configured and supplied by the business logic in web application server 14.

The zaplet 200 also includes a forwarding region 205 and a creation region 206 corresponding to segment 312 of the data structure 350. The region 205 allows a participant to add an address of a potential participant that is not listed in the address field 103. This means that any participant listed in the address list of field 103 can include any other potential participants not listed in the field 103. In other configurations, the ability of a participant to add another participant can be controlled by the creating participant of the zaplet.

The creation region 206 is also included in zaplet 200 to allow a participant to create an electronic form similar to electronic form 100 to initiate another zaplet process.

The zaplet 200 also includes a dynamic content region 210 corresponding to segment 310 of data structure 350 that receives the dynamic content 320. In one configuration, region 210 may include a graphical image, such as a pie chart, or other binary content including executable content. The content 320 of the region 210 can be dynamically updated by the business logic residing in the web application server 14.

The zaplet 200 also includes an interaction region 225 corresponding to segment 312 of the data structure 350. The interaction region can include images, such as check boxes, to select options created using the electronic form 100. For example, a poll can be initiated in electronic form 100 and the interaction region 225 could contain boxes to select a poll choice. The interaction region also contains a text box 223 that allows a participant to add a text passage to the zaplet. The interaction region may also include the name of the responding participant and his or her associated e-mail address.

A dynamic content region 213 corresponding to region 313 of data structure 350 is contained in zaplet 200 that receives the content 321. The content 321 can include text passages that are entered by participants using the interaction region 225. The business logic at the web application server 14 manages the text passages and causes changes to the variables in database 10 to update the content 321 and to display the updated content in region 213, when the participant opens the message. The displayed content in region 213 may include visual images, a list of participants who have entered text passages, or any other relevant dynamic content.

Figure 6:
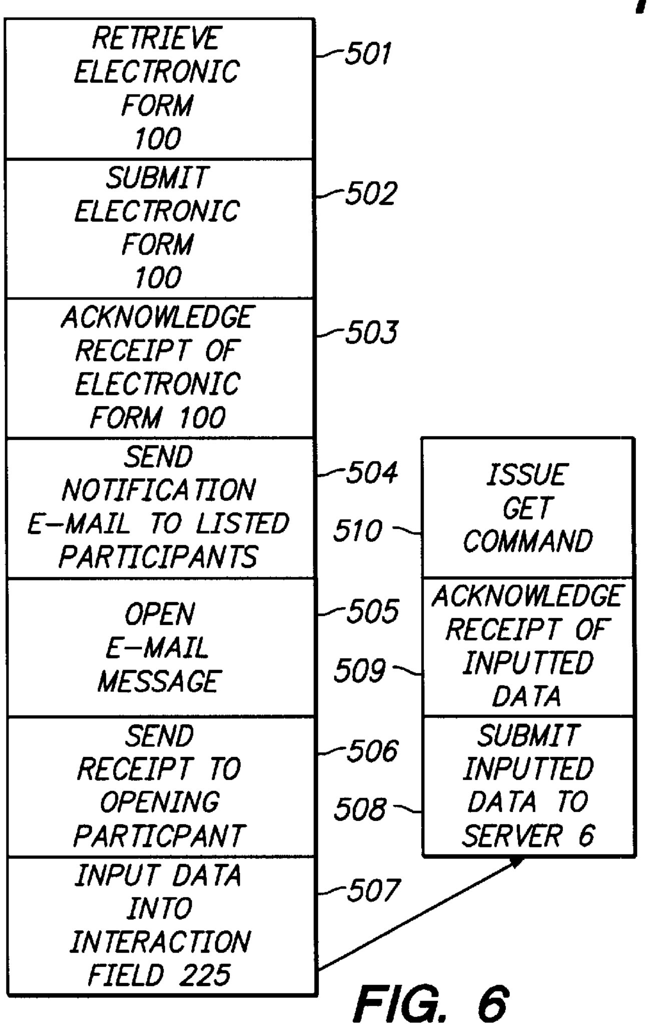
FIG. 6 is a flow chart illustrating a preferred method of the present invention.

FIG. 6 is a flow chart of a preferred method of the invention. Initially, one of the participants accesses a live electronic form 100 to begin a zaplet process (step 501). The requesting participant may access the form 100 from the database 10 via the web server 16, from a web site, or other resource as discussed above. To access the electronic form 100, the participant may specify a descriptor, such as a URL, associated with the electronic form 100. Once the electronic form 100 is displayed to the participant, the participant completes the fields 101, 102, 103, and 104. The participant may also complete field 105. The participant then submits the form to the server 6 (step 502).

Next, a confirmation message is sent from the web server 16 indicating that the content of the electronic form 100 was received, that the electronic form 100 was sent to the addresses listed in field 103, and any other errors associated with the processing of the electronic form 100 (step 503). Alternatively, the creating participant of the electronic form 100 may receive the e-mail message (step 504) described below as an acknowledgement that the form 100 was successfully received by the server 6.

Each of the participants in the list in field 103 receives an e-mail message associated with the zaplet (step 504) indicating that the zaplet process has been initiated. Next, a receiving participant opens the message (step 505). In one configuration, a receiving participant may be the creating participant. This mechanism could allow a creating participant to create a "personal" zaplet that only he or she could update or retrieve. Once the receiving participant opens the e-mail message, the dynamic content of the zaplet 200 is served essentially at viewing time to the display of the participant as follows (step 506).

Figure 7:
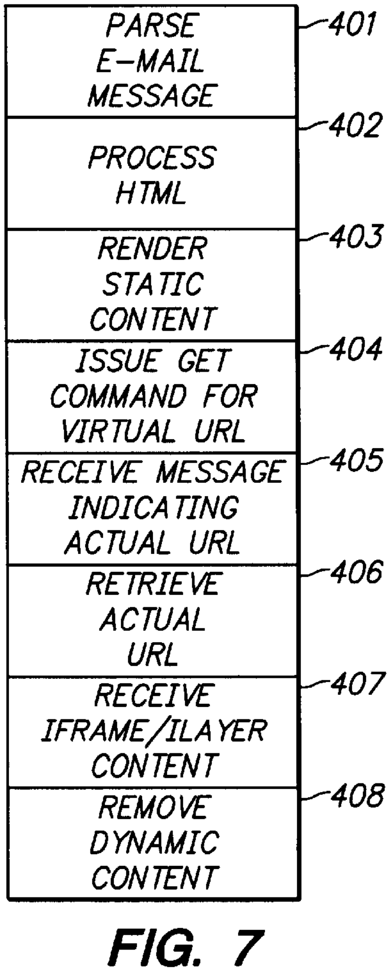
FIG. 7 is a flow chart illustrating a preferred method of accessing the zaplet by parsing the data structure of FIG. 4.

Referring to FIG. 7, the e-mail protocol residing at the participant begins by parsing the received e-mail according to the MIME and SMTP header and separators 300 (step 401). If the participant is capable of displaying the dynamic content of the zaplet in the segment 304, content is produced by parsing the HTML (step 402). The participant initially renders static components of the zaplet, such as in the regions 311 and 312 (step 403). To render the dynamic content in region 310, a parsing engine at the participant issues a get command using, for example, a virtual URL identified by a tag field in the HTML (step 404). The server 6 includes logic, such as business logic in web application server 14, to map the virtual URL to an actual URL for the dynamic content 320 of the dynamic content region 310, and returns a message indicating the actual URL for the dynamic content 320 corresponding to the virtual URL, which is received at the participant site (step 405). A get command for the actual URL is then issued (step 406). A web page indicated by the IFRAME/ILAYER region 313 of the data structure 350 can also be retrieved similar to steps 404–406 (step 407), and then the dynamic content 321 for the dynamic content region 313 is rendered (step 408).

Referring again to FIG. 6, once the zaplet 200 is retrieved by the participant, he or she inputs data into the interaction region 225 (step 507). For example, the user may input a text passage. At this stage, the dynamic content region 213 will include concatenated text messages and a list of message recipients as discussed above. The participant then submits the updated zaplet to the server 6 (step 508). Next, the submitting participant receives an acknowledgement from the web server 16 indicating that the zaplet was received (step 509). The e-mail protocol residing at the client may then issue at any time a new get command for the dynamic content in region 310 and/or region 313 to display the updated images and/or text content in the dynamic content regions 210 and 213 (step 510). Alternatively, after the participant submits his or her input (step 508), another instance of the zaplet could be served that includes the above acknowledgement, and also reflects the most recent dynamic content including the submission at step 508. In another configuration, the dynamic content of the zaplet could be updated "in-place". This means that the regions 210 and 213 could be updated to reflect the most recent content in the server 6 including the submission at step 508, as the participant is viewing the zaplet. Subsequent actions by any of the participants of the group to open a message will result in the display of the updated images and text content in the zaplet 200.

The preferred method permits participants to collaborate efficiently. Each participant can send and receive information that is current using dynamic regions 210 and 213. This means that participants can accurately respond or opine to a zaplet process with the most current information at their disposal.

The preferred method supports privacy and communications because the dynamic content can be restricted to those specified in field 103. Further, the preferred method and system allows content to be dynamically updated asynchronously relative to the sending of the documents or forms and asynchronously relative to any processes used by any other participants parsing the electronic messages. In this way, the zaplets received by participants of the group do not become stale or outdated. Additionally, the updated content includes dynamic information identifying changes that have occurred since the message was last viewed by the viewing participant. This means that the viewing participant can track the opinions, suggestions, or other comments made by other participants in a simple and quick manner. The preferred method also allows participants to interact with other participants in a group without the daunting task of "surfing" the Web to find the discussion management tool that manages the discussion. The preferred method and system also provides the highest quality service based upon the participant's e-mail application capabilities.

The preferred zaplet may be configured as a group choice tool for a choice making process. Certain choice making processes may include a schedule, poll, survey, election, RSVP, task allocation, wish list, donation confirmation, approval, recruitment vote, group seating selection, game next move selection, sporting event pool, payment authorization, purchase selection, or purchase authorization. In this way, the zaplet can be configured to allow multiple participants to collaborate and communicate in a choice making process. Further, choices can be aggregated within a zaplet to include multiple choices and can be mixed with other types of participant interaction or collaboration.

An example of scheduling participants in a group is as follows. A schedule can allow a group of participants to express preferences from a list of schedule or time options. Accordingly, a schedule zaplet can be used to schedule a meeting or a similar event among a group of participants.

Figure 8:
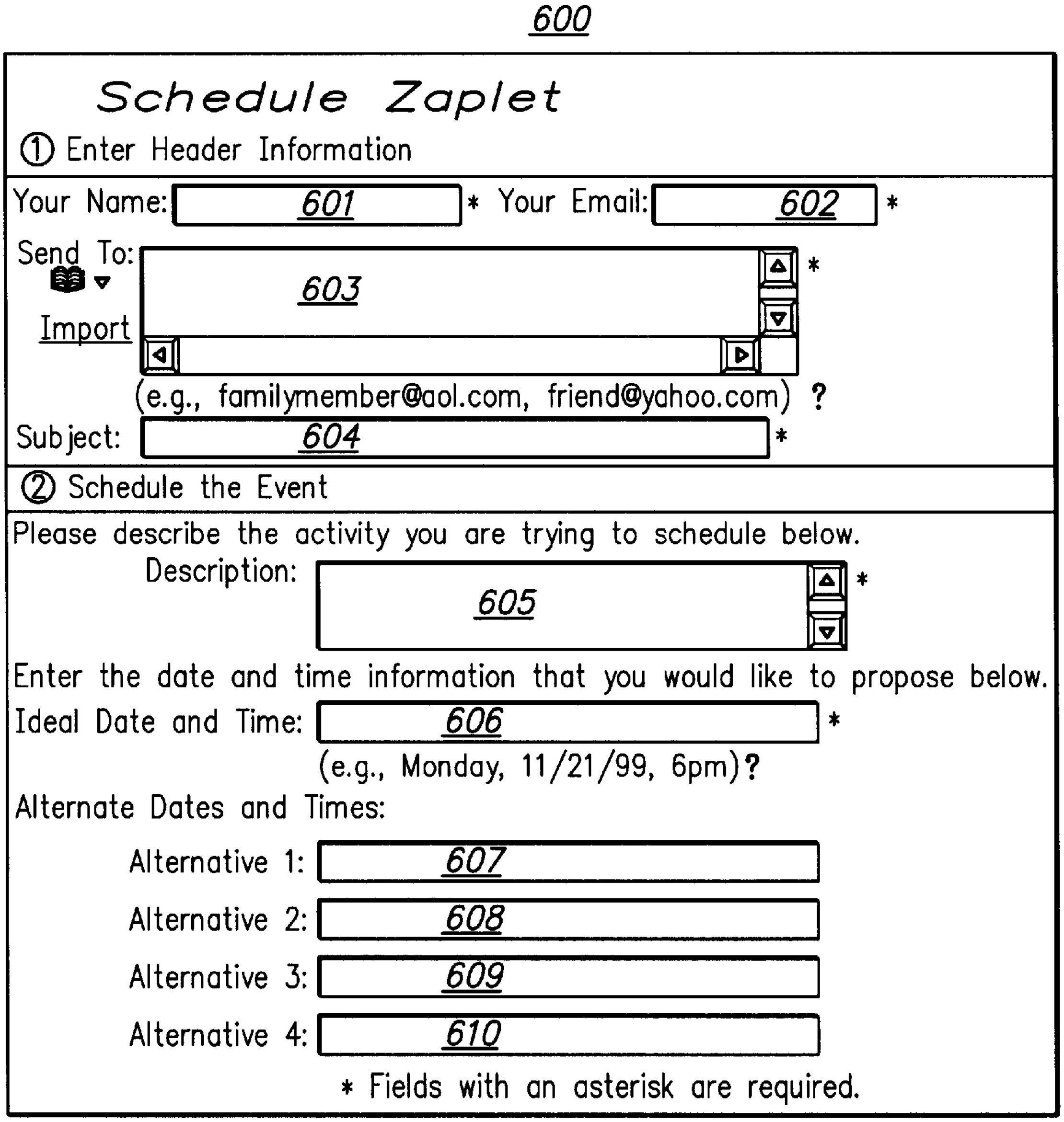
FIG. 8 illustrates an example electronic form to initiate a zaplet for scheduling a group of participants.

Initially, one of the participants accesses a live electronic form 600 (FIG. 8) similar to electronic form 100 above by executing step 501. In an example configuration shown in FIG. 8, the electronic form 600 may include a field 601 and a field 602. The fields 601 and 602 may be used to accept the initiating participant's name and network address, respectively. The electronic form 600 may also include a field 603 and a field 604. The fields 603 and 604 are configured similar to the fields 103 and 104 described above. Preferably, the electronic form 600 also includes a comment field 605 and schedule choice fields 606, 607, 608, 609, and 610. The comment field 605 is similar to the comment field 105 of the electronic form 100 described above. The field 606 may be used to specify an ideal date and time for a scheduled event. As shown in FIG. 8, the authoring participant may enter "Monday, 11/21/99, 6:00 PM." The fields 607–610 can be used to suggest alternative times for the scheduled event. The electronic form 600 may include any number of the fields 607–610.

Once the authoring participant completes the electronic form 600, the form is submitted to the server 6 at step 502. Next, steps 503, 504, 505, and 506 are executed as described above.

Once the e-mail protocol residing at the participant executes steps 401–408, as described in FIG. 7, a zaplet 700 is displayed to an accessing participant. As shown in FIG. 9, the zaplet 700 may include a banner 701 that includes the name of the initiating participant from the field 601, and the time and day on which the zaplet was initiated using the electronic form 600. In this example, the electronic form 600 was sent by "Beth Stearns" on "Thursday, December 2, 1999 1:52:40 PM P.S.T." The banner 701 may also include other information relevant to the zaplet 700. The zaplet 700 also includes a field 702 of an interaction region 703. The field 702 includes a list of times 723 that correspond to the times entered into the fields 606–610 in the electronic form 600. Additionally, the field 702 includes check boxes 720 that allow a participant to easily submit their preferences to a scheduled time. For example, a participant may choose "maybe" for each of the times 723.

The zaplet 700 also includes fields 704, 705, and 706. The interaction region 703 may enable a participant to add his or her name in the field 704, a network address, such as an electronic mail address in field 705, and additional textual comments in the field 706. Once the participant has completed the fields 704, 705, and 706 at step 507, the participant may then submit the choices 720 and any information inputted into the field 704, 705, or 706 by executing step 508 using the button 707. A button 708 may also be used to reset the content of the fields 704, 705, or 706 before submitting the input to the server 6. In certain embodiments, the interaction region 703 may be displayed outside of the zaplet 700. For example, the interaction region 703 may be included in another image displayed to the participants.

The preferred schedule zaplet 700 includes dynamic content regions 715 and 716. The dynamic content regions 715 and 716 are designed to aggregate the responses from the field 702 and interaction region 703, respectively. Preferably, the dynamic content of the region 715 is updated with the choices made using the check boxes 720 corresponding to the times 723. The dynamic content of the region 716 corresponds to the text input by any of the participants entered into the field 706. In one configuration, the dynamic content of the regions 715 and 716 is updated by the server 6 using the business logic described above.

The schedule zaplet 700 may also include a forwarding region 711. The region 711 may be used to add additional participants outside those listed in the field 603. Once the region 711 is completed by the participant, he or she may forward the schedule zaplet 700 using the button 712. The forwarding region 711 may be displayed outside of the zaplet 700. For example, the forwarding region may be displayed as a separate image to the participants.

Figure 10:
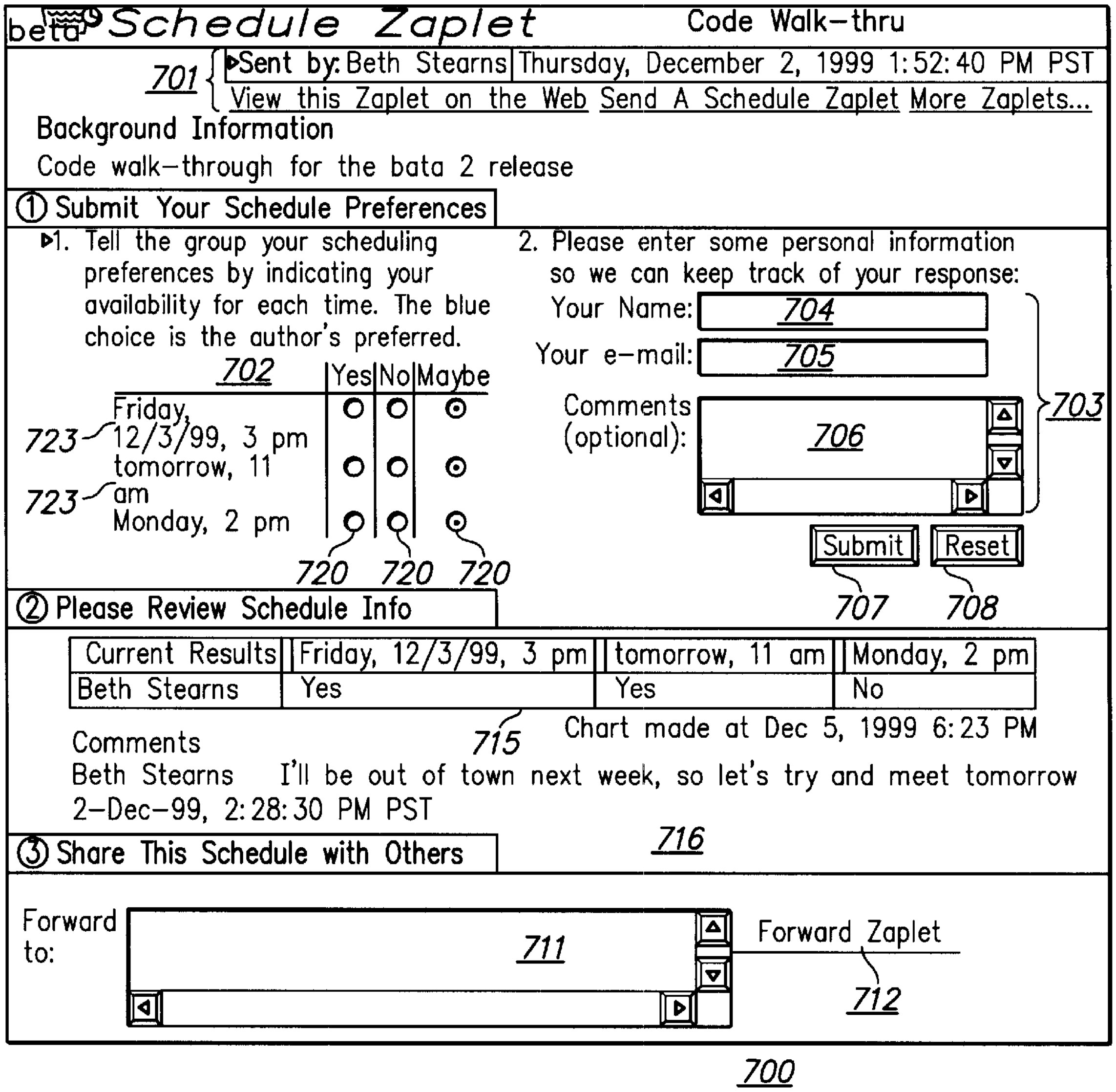
FIG. 10 is an example of an updated image of the zaplet of FIG. 9.

FIG. 10 shows an updated view of the zaplet 700. As shown, the dynamic content region 716 includes the concatenated text corresponding to the input entered by a participant in the field 706 of the interaction region 703. The participant's name and the time and date of the input may also be shown in the dynamic content region 716. In this example, the participant is "Beth Steams," the input is sent to the server 6 on "2-Dec-99, 2:28:30 PM PST," and the text input is "I'll be out of town next week, so let's try and meet tomorrow." Subsequent text input by the same or other participants in the group may be displayed in the same manner.

FIG. 10 also shows that the name of the participant and the choices made using the check boxes 720 corresponding to the times 723 are entered into the region 715. For example, the name of the participant is "Beth Steams" and the choices are "Yes", "Yes", and "No."

A participant who accesses the zaplet, such as by clicking on an electronic mail message in his or her in box, is able to view an aggregated list of choices and text input before responding to the schedule. Further, a participant can also determine how his or her inputs have affected the scheduling process. In some configurations, a link or button may be provided in the zaplet to enable a participant to export his or her schedule choice to a calendar or other application.

The schedule zaplet may also be configured to send an alert to an initiating participant that one or more of the participants has responded to the scheduled event. In this way, the initiating participant can ensure that all of the participants have replied to the scheduled event. Alternatively, the initiating participant can be prompted to remind the unresponding participants to respond. The initiating participant can also use the alert to finalize the attendance at the scheduled event by sending the zaplet to the participants with an imposed deadline to respond. If any of the participants do not respond before the deadline, they are assumed to be not attending the scheduled event.

The server 6 can also be configured to include logic to determine automatically the availability of a participant without interaction or response by the participant. For example, the server 6 can be configured to compare entries in a calendar application with the proposed scheduled event. If no conflict arises, the calendar can be automatically updated and a reminder or notification can be sent to the participant. Additionally, the server 6 can be configured to prioritize scheduled events based on the identity of the initiating participant. In this case, the other participants can be automatically assigned to attend the schedule event. If a conflict arises, a lower priority event may be rescheduled and the participant is notified of the change.

In another example, the zaplet can be used to poll a group of participants. A poll can be used to collect responses from a group of participants on a particular subject using, for example, poll choices. Initially, the initiating participant accesses a live electronic form 900 (FIG. 11) by executing step 501. The initiating participant may access the form 900 similar to the form 100 described above. As shown in FIG. 11, the electronic form 900 may include fields 901, 902 and 903. The fields 901, 902, and 903 are similar to the fields 601, 602, and 603, respectively, as described above. The electronic form 900 may also include a subject field 904 that is similar to the subject field 604 described above.

The electronic form 900 may also include a question field 905, one or more poll choice fields 906, and a comment field 910. The field 905 may be used to author a question to be answered. The possible choices to answer the question posed in the field 905 may be listed in the fields 906. The field 910 may be used to add additional background information to further clarify the question posed in the field 905. Once the initiating participant completes the fields 901–906, and 910, the form is then submitted at step 502. The steps 503–506 may then be executed as describe above.

The e-mail protocol residing at the participant then executes steps 401–408, as described in FIG. 7. Once step 408 is complete, a zaplet 1000 may be displayed to an accessing participant. As shown in FIG. 12, the zaplet 1000 may include a banner 1001 having the name of the initiating participant and the time the electronic form 900 was sent. In this example, the author is "Beth Steams" and the zaplet was sent on "Thursday, December 2, 1999 3:34:10 PM P.S.T." The zaplet 1000 may also include an entry 1015 that corresponds to the text inputted in the field 910.

The zaplet 1000 also includes a field 1002 of an interaction region 1003 similar to the interaction region 703 described above. The field 1002 may include the poll choices listed in the field 906 in the electronic form 900. Each of the choices may also include a button 1023 that enables a participant to select one or more of the choices to answer the question posed in the field 905. The interaction region 1003 also includes fields 1004, 1005, and 1006. A participant may enter his or her name in the field 1004, a network address in the field 1005, and any comments in the field 1006. Once the participant has completed any of the fields 1004, 1005, and 1006 and has made a choice selection using one of the buttons 1023, the zaplet 1000 may then be submitted to the server 6 at step 508 using the button 1007. A button 1008 may also be used to reset the content of the fields 1004, 1005, or 1006 before submitting the input to the server 6. In certain embodiments, the interaction region 1003 may be displayed outside of the zaplet 1000. For example, the interaction region 1003 may be included in another image displayed to the participants.

The zaplet 1000 also includes dynamic content regions 1009 and 1010. The region 1009 may be updated based on a selection of one of the buttons 1023 by the participant. The updated content may be presented in the form of a pie chart, bar graph, table, thermometer indicator, line graph, histogram, or other suitable display. The choice selections listed in the field 906 may also be listed in the region 1009. The region 1010 may be used to aggregate comments from any of the participants by concatenating the input from the interaction region 1003 using the business logic as described above. In this way, a viewing participant can have access to the most recent input by any of the prior responding participants before making a calculated choice.

The zaplet 1000 may also include a forwarding region 1014. In this configuration, the zaplet 1000 may be forwarded to other participants not listed in the field 903. In this way, more participants can be added to the group. To forward the zaplet 1000, the forwarding participant can click on the button 1015. The forwarding region 1014 may be displayed outside of the zaplet 1000. For example, the forwarding region may be displayed as a separate image to the participants.

Figure 13:
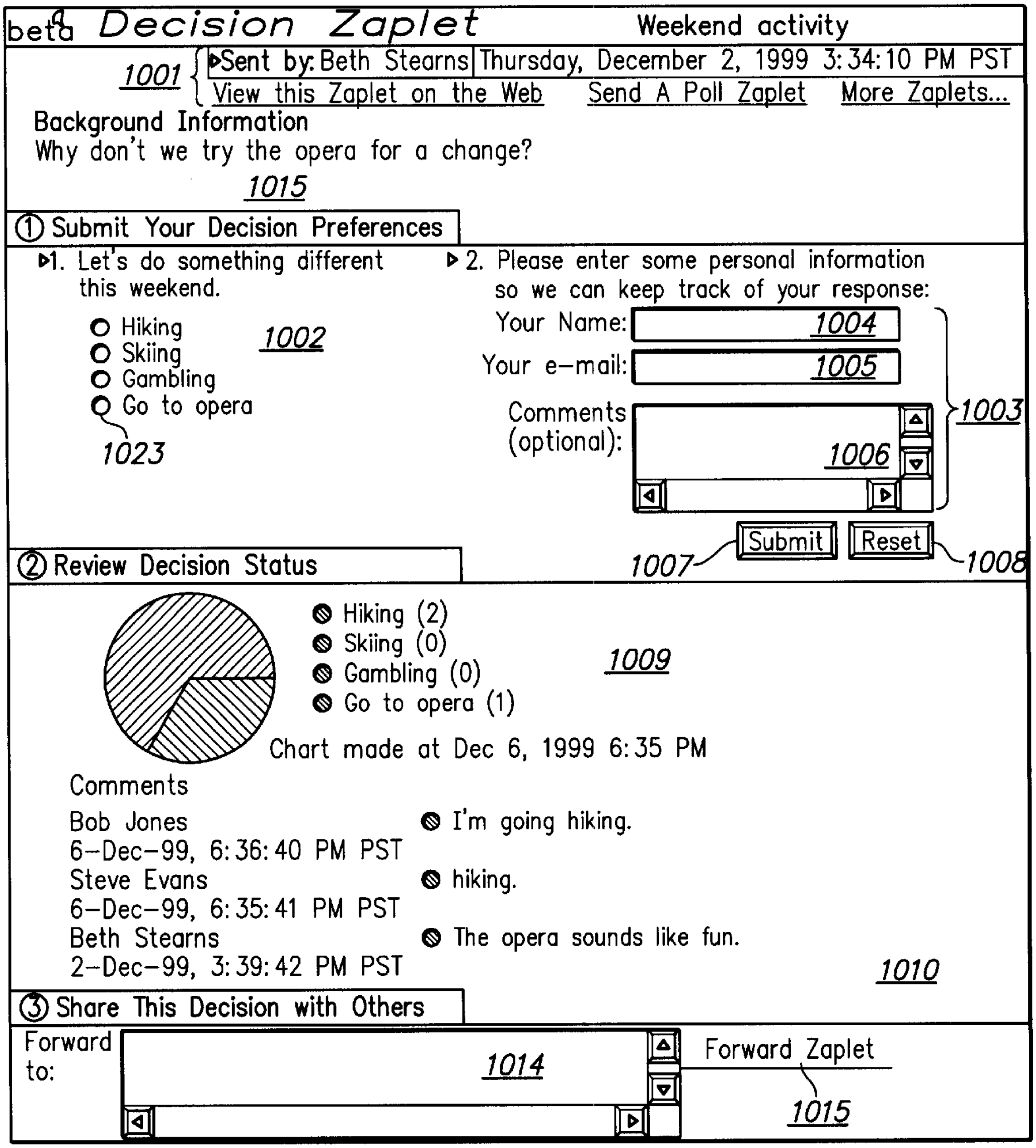
FIG. 13 is an example of an updated image of the zaplet of FIG. 12.
Figure 15:
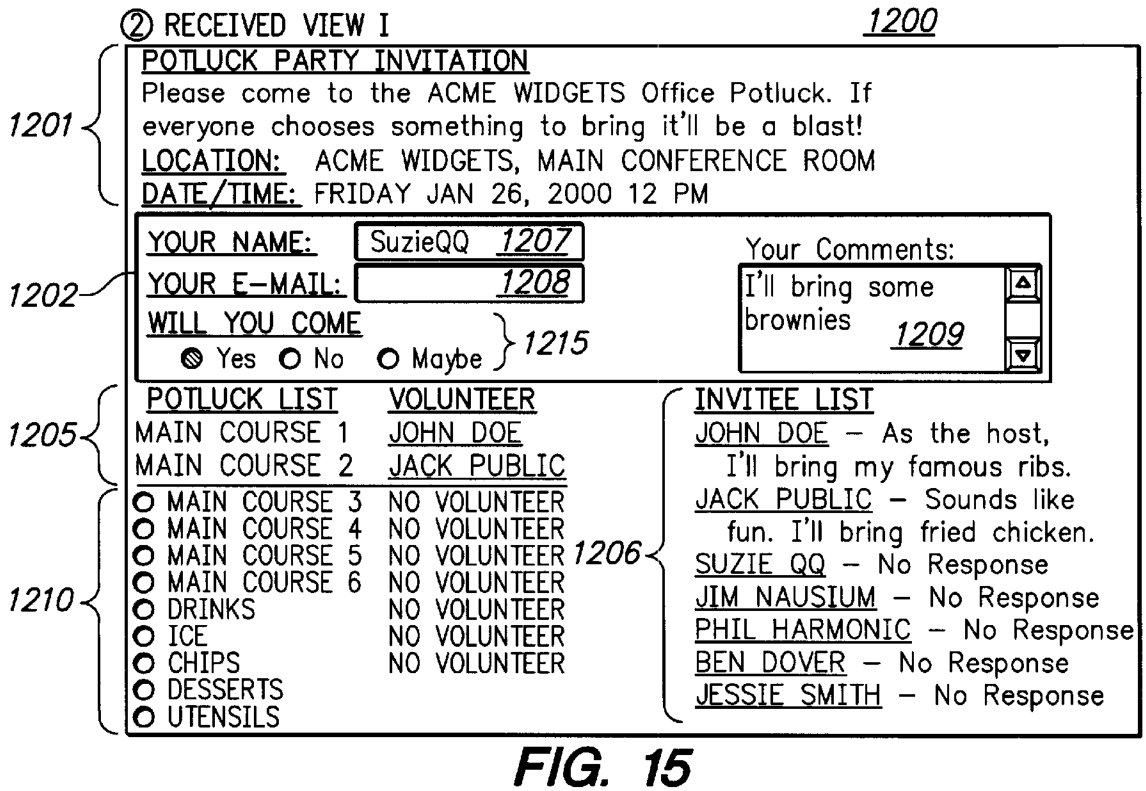
FIG. 15 illustrates an example image of a zaplet for supporting an RSVP and list management among a group of participants.

FIG. 13 shows an updated view of the zaplet 1000. As shown, the dynamic content region 1010 includes the concatenated text corresponding to the input entered by the participants in the field 1006 of the interaction region 1003. The participants' name and the time and date of the inputs may also be shown in the dynamic content region 1010. In this example, one of the participants' is "Beth Steams," her input is sent to the server 6 on "2-Dec-99, 3:39:42 PM PST," and the text input is "The opera sounds like fun." Subsequent text input by the same or other participants in the group may be displayed in the same manner.

FIG. 13 also shows that the name of the participant and the choices made using the buttons 1023 are entered into the region 1009. For example, the choices for "Hiking," "Gambling," "Skiing," and "Go to the opera" can be displayed using a pie chart. In FIG. 13, the number of choices for "Hiking" is "2" and the number of choices for "Go to the opera" is "1".

A participant who accesses the zaplet, such as by clicking on an electronic mail message in his or her in box, is able to view an aggregated list of choices and text input before responding to the poll. Further, a participant can also determine how his or her inputs have affected the polling process.

In other configurations, the initiating participant can specify how a consensus for the polling process is to be reached. For example, the poll may be decided by a majority, weighted, or unanimous vote. The business logic may be configured to automatically determine the results of the poll based on the specified consensus. In other configurations, a "silent vote" can be conducted. The initiating participant and the other participants may not know the results of the poll until the specified consensus is reached. This means that the server 6 can be configured to automatically determine the results of the poll and then update the zaplet accordingly. The business logic may be configured in the web application server 14, as described above.

In another example, the zaplet can be used as a tool for an RSVP or invitation. Initially, the initiating participant accesses a live electronic form 1100 (FIG. 14) by executing the step 501. The initiating participant may access the form 1100 similar to the form 100 described above. As shown in FIG. 14, the electronic form 1100 may include fields 1101, 1102, and 1103. The fields 1101, 1102, and 1103 are similar to the fields 901, 903, and 902 described above. The electronic form 1100 may also include a comment field 1110 to add additional background information concerning the invitation.

The electronic form 1100 also includes an event region that can include details about the event. The region 1104 may include details concerning the type of event, location or address of the event, date or time of the event, other event information, and a date by which an RSVP should be received.

A region 1105 may include a list of items to bring to the event, such as a potluck list, and a quantity field associated with each item. Once the initiating participant completes the fields of the electronic form 1100, the form is then submitted at the step 502. The steps 503–506 may then be executed as described above.

The e-mail protocol residing at the participant then executes steps 401–408, as described in FIG. 7. Once step 408 is complete, a zaplet 1200 may be displayed to an accessing participant. The zaplet 1200 may include an information region having information corresponding to the fields 1101, 1102, 1103, 1110, and the region 1104.

The zaplet 1200 may also include an interaction region 1202 similar to the interaction region 703 described above and having fields 1207, 1208, and 1209. The fields 1207, 1208, and 1209 are similar to the fields 704, 705, and 706 described above. The interaction region 1202 may also include a choice field 1215 having a button corresponding to "yes", "no", and "maybe." This feature of the zaplet 1200 allows a participant receiving the zaplet 1200 to quickly and easily choose whether he or she can attend the event.

The zaplet 1200 may also include dynamic content regions 1205, 1206, and 1210. The dynamic content region 1205 may list the participants who have volunteered to bring an item from the items listed in the region 1105. The dynamic content region 1210 may list those items listed in the region 1105 that have not been chosen by any of the participants. The dynamic content region 1210 may also include a shopping basket, a venue seating chart, or a game board. The dynamic content region 1206 is similar to the region 1010 described above and may be used to aggregate comments from any of the participants received from the server 6 via the interaction region 1202.

Figure 16:
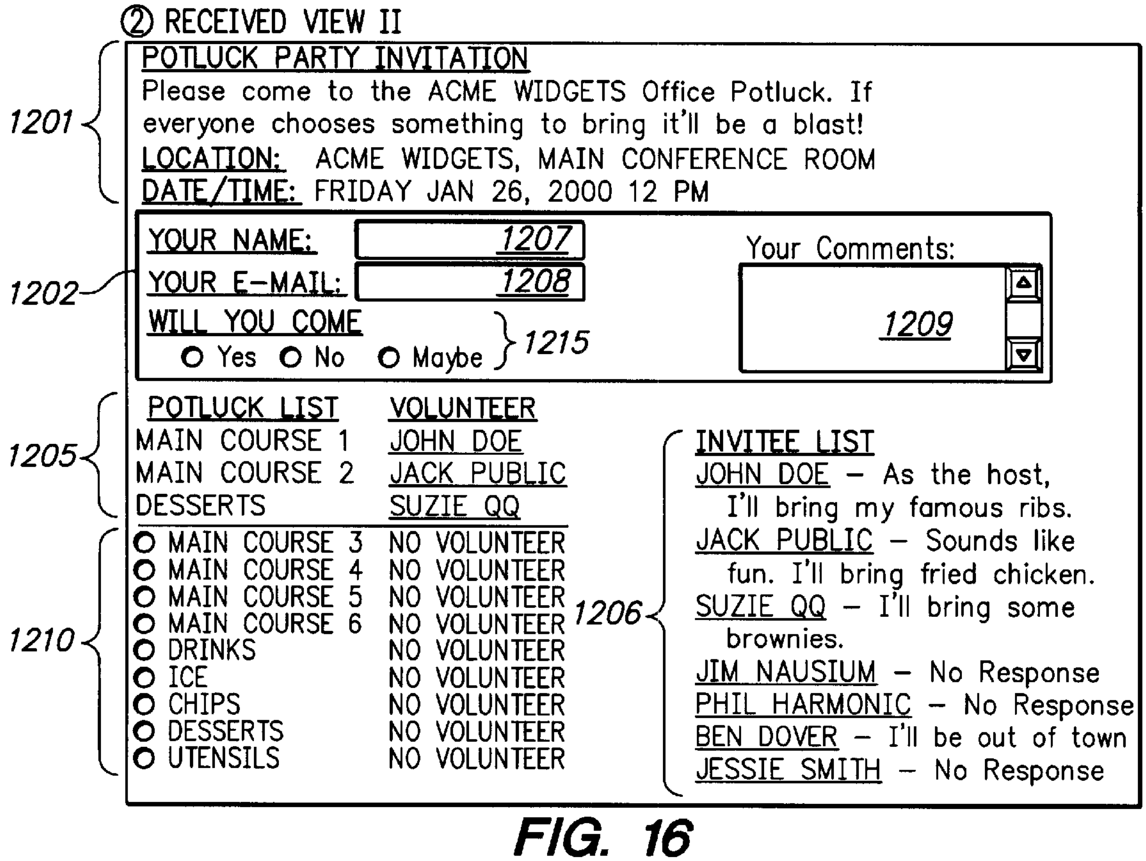
FIG. 16 illustrates an example of an updated image of the zaplet of FIG. 15.

FIG. 16 illustrates an updated view of the zaplet 1200. As shown in FIG. 16, the dynamic content regions 1205 and 1210 can be updated to reflect volunteers and items selected from the list corresponding to the region 1105. In this example, "Suzie QQ" chooses "desserts" and the dynamic content region 1206 reflects that "Suzie QQ" replies "I'll bring some brownies." In some configurations, only a participant attending the event may choose an item to bring from the list of items in the region 1105. In some configurations, as the invited participants indicate that they are attending and have volunteered to bring various items, the list of potential items from which a participant may choose may decrease. Thus, the zaplet 1200 can be used to manage a list of items and avoid unwanted or redundant items from being brought or purchased for an event.

The preferred group choice tool is simple and allows participants access to an aggregated state of choice making when they access the zaplet. This is because the information in the dynamic content regions (e.g., 715, 716, 1009, 1010, 1205, 1206, and 1210) is current when accessed by any of the participants using the preferred methods and systems described above. Further, the preferred group choice tools do not require a proprietary-client system. This is because the zaplet process implements HTML, SMTP, HTTP, and MIME technologies. Also, the participant is immediately provided with the result of his or her contribution to the choice making process. Moreover, the preferred group choice tools can support large numbers of participants in a group, and also provides the look and feel of live interaction by supplying the most current information to the participant once the zaplet is accessed. Yet, the participant is not burdened by having to be present in a real time conferencing environment. This allows the participant to calmly study and contemplate his or her choice. Additionally, the dynamic content region can be used to simply and easily indicate that the process interaction has terminated. This means that the participant will not unnecessarily contribute to the process interaction. The preferred tool also allows the initiating participant to control access to the choice making process. This is because the list of participants can be specified by the initiating participant. Further, no cumbersome login steps are required by members of the group.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. For example, variations in the specification of which e-mail protocol a particular participant supports can be sent by the participant to the server 6 so that a different message format based on that knowledge can be forwarded to the participant. Further, the interaction region could include a dynamic content region. In another example, a zaplet may include a region to communicate a decision, e.g., the results of a poll, to all participants after input from the participant is no longer accepted. Accordingly, other embodiments are within the scope of the following claims.

APPENDIX A

```
1 Deliver Electronic (Authoring) Form
get ZAPLET_TYPE, ZAPLET_STYLE from request
open file ELECTRONIC_FORM for writing
write Creating_Participant_Input_Field(ZAPLET_TYPE, ZAPLET_STYLE) to
ELECTRONIC_FORM
write Creating_Participant_Email_Input_Field(ZAPLET_TYPE, ZAPLET_STYLE) to
ELECTRONIC_FORM
write Subject_Input_Field(ZAPLET_TYPE, ZAPLET_STYLE) to ELECTRONIC_FORM
write Recipients_Input_Field(ZAPLET_TYPE, ZAPLET_STYLE) to
ELECTRONIC_FORM
write Zaplet_Specific_Data_Input_Fields(ZAPLET_TYPE, ZAPLET_STYLE) to
ELECTRONIC_FORM
write Zaplet_Type_Constant(ZAPLET_TYPE, ZAPLET_STYLE) to
ELECTRONIC_FORM
write Zaplet_Style_Constant(ZAPLET_TYPE, ZAPLET_STYLE) to
ELECTRONIC_FORM
write Static_Form_Content(ZAPLET_TYPE, ZAPLET_STYLE) to ELECTRONIC_FORM
open stream CLIENT for writing
write ELECTRONIC_FORM to CLIENT
2 Receive Electronic (Authoring) Form Input and Send Mail
get CREATING_PARTICIPANT_NAME, CREATING_PARTICIPANT_EMAIL,
SUBJECT,
ZAPLET_TYPE,
  ZAPLET_STYLE, ZAPLET_SPECIFIC_DATA, RECIPIENTS from request
set MESSAGE_ID = create_unique_id()
open file MESSAGE for writing
create (Message_Record(MESSAGE_ID, CREATING_PARTICIPANT_NAME,
CREATING_PARTICIPANT_EMAIL,
  SUBJECT ZAPLET_TYPE, ZAPLET_STYLE, ZAPLET_SPECIFIC_DATA,
RECIPIENTS)) in
database
write MESSAGE_ID, CREATING_PARTICIPANT_NAME,
CREATING_PARTICIPANT_EMAIL,
  SUBJECT, ZAPLET_TYPE, ZAPLET_STYLE, ZAPLET_SPECIFIC_DATA,
RECIPIENTS to
MESSAGE
if(User_Record(CREATING_PARTICIPANT_EMAIL) not_exists_in database){
  create User_Record(CREATING_PARTICIPANT_EMAIL,
CREATING_PARTICIPANT_NAME)
in database
}
foreach (USER_EMAIL in RECIPIENTS){
  if (User_Record(USER_EMAIL) not_exists_in database) {
    create User_Record(USER_EMAIL) in database
  }
}
foreach (QUESTION in request) {
  set QUESTION_ID = create_unique_id()
  get QUESTION_CONTENT from request
  write QUESTION_ID, QUESTION_CONTENT to MESSAGE in database
  foreach (CHOICE in QUESTION) {
    set CHOICE_ID = create_unique_id()
    write CHOICE_ID, CHOICE to MESSAGE
  }
}
open file MAIL for writing
write (Transport_Headers(MESSAGE)) to MAIL
write ("From:" + Creating_Participant(MESSAGE)) to MAIL
write ("To:" + Recipients(MESSAGE)) to MAIL
write ("Subject:" + Subject(MESSAGE)) to MAIL
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion_MESSAGE)) to MAIL
write (URL(MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
```

APPENDIX A-continued

```
   write (Interaction__Form(QUESTION)) to MAIL
   write (Static__Portion(QUESTION)) to MAIL
   write (Dynamic__Image__Portion(QUESTION)) to MAIL
   write (IFRAME__ILAYER__Portion(QUESTION)) to MAIL
   write (IFRAME__ILAYER__Alternative__Portion(QUESTION)) to MAIL
}
write (ENCODING__SEPARATOR) to MAIL
if (SUPPORT__IMAGE__DATA)
   write (Image__Data(MESSAGE)) to MAIL
open stream TRANSPORT__SERVER for writing
write MAIL to TRANSPORT__SERVER
open file REPLY for writing
write Confirmation__Message(MAIL) to REPLY
open stream CLIENT for writing
write REPLY to CLIENT
3 Serve Dynamic Rich-Text Contents
get MESSAGE__ID from request
load MESSAGE by MESSAGE__ID from database
open file REPLY for writing
foreach (QUESTION in MESSAGE) {
   write (Format__Dynamic__Portion(QUESTION)) to REPLY
   foreach (RESPONSE in QUESTION){
      write (Format__Dynamic__Portion(RESPONSE)) to REPLY
   }
}
open stream CLIENT for writing
write REPLY to CLIENT
4 Serve Dynamic Image Contents
get MESSAGE__ID, QUESTION__ID from request
load QUESTION by QUESTION__ID from database
open file IMAGE for writing
write (Format__Image(QUESTION, Summarize(Responses(QUESTION)))) to IMAGE
open stream CLIENT for writing
write IMAGE to CLIENT
5 Receive Response Form Input
get MESSAGE__ID, QUESTION__ID, RESPONDER__NAME, RESPONDER__EMAIL,
COMMENT,
   QUESTION__SPECIFIC__INFO from request
if (User__Record(RESPONDER__EMAIL) not__exists__in database) {
   create User__Record(RESPONDER__EMAIL, RESPONDER__NAME) in database
}
if (Allowed__To__Respond(RESPONDER__EMAIL, QUESTION) {
   create__or__update Response__Record(MESSAGE__ID, QUESTION__ID,
RESPONDER__EMAIL,
COMMENT, QUESTION__SPECIFIC__INFO) in database
}
open file REPLY for writing
get MESSAGE by MESSAGE__ID from database
write (Confirmation__View(MESSAGE)) to REPLY
open stream CLIENT for writing
write REPLY to CLIENT
6 Resend or Forward Message
get MESSAGE__ID, NEW__RECIPIENT__EMAILS from request
foreach (USER__EMAIL in NEW__RECIPIENT__EMAILS){
   if (User__Record(USER__EMAIL) not__exists__in database){
      create User__Record(USER__EMAIL) in database
   }
}
get MESSAGE by MESSAGE__ID from database
set Recipients(MESSAGE) = Recipients(MESSAGE)+NEW__RECIPIENT__EMAILS
update Message__Record(MESSAGE) in database
open file MAIL for writing
write (Transport__Headers__MESSAGE)) to MAIL
write ("From:" + Creating__Participant(MESSAGE)) to MAIL
write ("To:" + NEW RECIPIENT__EMAILS) to MAIL
write ("Subject:" + Subject(MESSAGE)) to MAIL
write (Encoding__Headers(MESSAGE)) to MAIL
write (ENCODING__SEPARATOR) to MAIL
write PLAIN__TEXT__ENCODING__LABEL) to MAIL
write (Plain__Text__Static__Portion(MESSAGE)) to MAIL
write (URL(MESSAGE)) to MAIL
write (ENCODING__SEPARATOR) to MAIL
write (RICH__TEXT__ENCODING__LABEL) to MAIL
write (Rich__Text__Static__Portion(MESSAGE)) to MAIL
foreach (QUESTION in MESSAGE) {
   write (Interaction__Form(QUESTION)) to MAIL
   write (Static__Portion(QUESTION)) to MAIL
   write (Dynamic__Image__Portion(QUESTION)) to MAIL
   write (IFRAME__ILAYER__Portion(QUESTION)) to MAIL
```

APPENDIX A-continued

```
  write (IFRAME_ILAYER_Alternative_Portion(QUESTION)) to MAIL
}
write (ENCODING_SEPARATOR) to MAIL
if(SUPPORT_IMAGE_DATA)
  write (Image_Data(MESSAGE)) to MAIL
open stream TRANSPORT_SERVER for writing
write MAIL to TRANSPORT_SERVER
open file REPLY for writing
write Confirmation_Message(MAIL) to REPLY
open stream CLIENT for writing
write REPLY to CLIENT
```

What is claimed is:

1. A network system for making choices among a group of participants, comprising:

a server having an associated database and adapted to be used in the network, means in the server for generating and sending an electronic message to the participants, means in the server for generating an electronic medium stored in the database and associated with the electronic message to at least one of the participants in response to a first open action of the electronic message by the at least one participant, the electronic medium containing choices to be selected and all then-current updates received at the server from any other participants;

an interface in the electronic medium for communicating input from the participants to the electronic medium in the server, the input being associated with the choices;

a plurality of dynamic content regions in the electronic medium, each of the dynamic content regions having dynamic content associated therewith in the database; and logic in communication with the database to asynchronously dynamically update the electronic medium in the database in response to said input and to dynamically retrieve the dynamic content of the electronic medium stored in the database including all then-current updates in response to said input, each of the dynamic content regions being updated with the dynamic content and the dynamic content including one of the selected choices and the input from the participants.

2. The network system of claim 1, wherein the choices comprise one of schedule, poll, survey, election, RSVP, task allocation, wish list, donation confirmation, approval, recruitment vote, group seating selection, game next move selection, sporting event pool, payment authorization, purchase selection, and purchase authorization.

3. The network system of claim 1, wherein the dynamic content comprises graphics representative of the selected choices.

4. The network system of claim 3, wherein the graphics comprise one of a pie chart, a bar graph, line graph, histogram, table, thermometer indicator, shopping basket, venue seating chart, game board, and text.

5. The network system of claim 1, wherein the dynamic content comprises concatenated text corresponding to the input from the participants.

6. The network system of claim 1, further comprising an external source in data communication with the server, the external source delivering data to the dynamic content regions.

7. The network system of claim 1, wherein the electronic medium further comprises a forwarding region, the forwarding region being enabled to increase the number of the participants.

8. The network system of claim 1, wherein the electronic medium is adapted for use with an electronic mail protocol.

9. The network system of claim 1, wherein the network system is adapted to support one of an Internet and an electronic mail protocol.

10. The network system of claim 1, wherein the server is configured to send the electronic message after receiving an electronic form.

11. The network system of claim 1, wherein the electronic form includes a list of the choices and network addresses for each of the selected participants.

12. The network system of claim 1, wherein the server is configured to send a then current dynamic content from the database in response to a second open action.

13. A method for making choices among a group of participants, comprising:

generating an electronic form having a plurality of network addresses associated with the participants, and specifying one or more choices to be selected;

receiving the electronic form at a server, sending an electronic message to at least one of the participants from the server and associated with the electronic form;

in response to an open action by the at least one participant, sending to the at least one participant, from an electronic medium associated with the electronic form and the electronic message and having dynamic content regions in response to the open action stored in the server and including all updates thereto, the electronic medium being stored in the server, the then current dynamic content representative of the selected choices;

receiving one of input from any of the participants and a selection of one of the choices by any of the participants; and asynchronously dynamically updating and dynamically retrieving the selected choices from the server based on the one of input from any of the participants and a selection of one of the choices by any of the participants.

14. The method of claim 13, further comprising sending the updated dynamic content stored in the server in response to another open action by any of the participants.

15. The method of claim 13, wherein the choices comprise one of schedule, poll, survey, election, RSVP, task allocation, wish list, donation confirmation, approval, recruitment vote, group seating selection, game next move selection, sporting event pool, payment authorization, or purchase authorization.

16. The method of claim 13, wherein the updating step further comprises displaying graphics representative of the selected choices in one of the dynamic content regions.

17. The method of claim 13, wherein the updating step further comprises aggregating the input from any of the participants in one of the dynamic content regions.

18. The method of claim 13, wherein the electronic medium further comprises a forwarding region and the method further comprises enabling the forwarding region to increase the number of participants.

19. The method of claim 13, further comprising updating the dynamic content regions with data from an external source in data communication with the server.

20. The method of claim 13, further comprising configuring the server to support one of an electronic mail and an Internet protocol.

21. The method of claim 13, wherein the electronic message is an electronic mail message.

22. A method for scheduling an event among a group of participants, comprising:

generating an electronic form having a plurality of network addresses associated with the participants, and specifying one or more schedule choices to be selected;

receiving the electronic form at a server, sending an electronic message to at least one of the participants from the server and associated with the electronic form;

in response to an open action by the at least one participant, sending to the at least one participant, from an electronic medium associated with the electronic form and the electronic message and having dynamic content regions in response to the open action stored in the server and including all updates thereto, the electronic medium being stored in the server, the then current dynamic content representative of the schedule choices selected by any of the participants;

receiving one of input from any of the participants and a selection of one of the choices by any of the participants; and asynchronously dynamically updating and dynamically retrieving the selected schedule choices from the server based on the one of input from any of the participants and a selection of one of the schedule choices by any of the participants.

23. The method of claim 22, wherein the generating step further comprises inputting a description of the scheduled event into the electronic form.

24. The method of claim 22, wherein the updating step further comprises updating the dynamic content regions to include graphics representative of the selected schedule choices.

25. The method of claim 22, wherein the electronic medium further comprises an electronic medium and the updating step further comprises accepting the input at the server from the interface and updating the dynamic content to reflect the input.

26. A method for polling among a group of participants, comprising:

generating an electronic form having a plurality of network addresses associated with the participants, and specifying one or more poll choices to be selected;

receiving the electronic form at a server, sending an electronic message to at least one of the participants from the server and associated with the electronic form;

in response to an open action by the at least one participant, sending to the at least one participant, from an electronic medium associated with the electronic form and the electronic message and having dynamic content regions in response to the open action stored in the server and including all updates thereto, the electronic medium being stored in the server, the then current dynamic content representative of the poll choices selected by any of the participants;

receiving one of input from any of the participants and a selection of one of the choices by any of the participants; and asynchronously dynamically updating and dynamically retrieving the selected schedule choices from the server based on the one of input from any of the participants and a selection of one of the poll choices by any of the participants.

27. The method of claim 26, wherein the generating step further comprises inputting a description of the poll into the electronic form.

28. The method of claim 26, wherein the updating step further comprises updating the dynamic content regions to include graphics representative of the selected poll choices.

29. The method of claim 26, wherein the electronic medium further comprises an electronic medium and the updating step further comprises accepting the input at the server from the interface and updating the dynamic content to reflect the input.

30. A method for inviting a group of participants to an event, comprising:

generating an electronic form having a plurality of network addresses associated with the participants invited to the event, and specifying one or more invitation choices to be selected;

receiving the electronic form at a server, sending an electronic message to at least one of the participants from the server and associated with the electronic form;

in response to an open action by the at least one participant, sending to the at least one participant, from an electronic medium associated with the electronic form and the electronic message and having dynamic content regions in response to the open action stored in the server and including all updates thereto, the electronic medium being stored in the server, the then current dynamic content representative of the invitation choices selected by any of the invited participants;

receiving one of input from any of the participants and a selection of one of the choices by any of the participants; and asynchronously dynamically updating and dynamically retrieving the selected invitation choices from the server based on the one of input from any of the invited participants and a selection of one of the invitation choices by any of the invited participants.

31. The method of claim 30, wherein the electronic form further comprises a plurality of items to be selected from a list.

32. The method of claim 31, wherein the electronic medium is configured with the plurality of items and at least one of the dynamic content regions is updated to reflect any of the items selected by any of the participants.

33. The method of claim 32, wherein the list of items is reduced when any of the items is selected by the invited participants.

34. An apparatus for facilitating choice making by participants, comprising:

a data store comprising one or more stored electronic media, each electronic medium associated with an electronic message, each electronic medium having one or more dynamic content elements associated therewith and stored in the data store, each electronic medium comprising one or more choices for selection;

a processor that is communicatively coupled to the data store; and a memory that is communicatively coupled to the data store and comprising one or more sequences of instructions which, when executed by the processor, cause the processor to carry out the steps of:

generating and sending a first electronic message to one or more selected participants;

asynchronously receiving, from one or more of the selected participants, one or more selections of choices in the first electronic message;

dynamically updating one of the dynamic content elements of an electronic medium that is stored in the data store and associated with the first electronic message based on the one or more selections;

receiving information specifying a first open action from any other participant among the selected participants;

providing the dynamic content elements from the electronic medium, including all then current updates, to the other participant for display in association with the first electronic message.

35. An apparatus as recited in claim 34, wherein the choices in the electronic medium comprise one of a schedule, a poll, a survey, an election, a response to an invitation, a task allocation, a recruitment vote, a payment authorization, a purchase selection, and a purchase authorization.

36. An apparatus as recited in claim 34, wherein the sequences of instructions further comprise instructions which, when executed by the processor, cause the processor to carry out the steps of generating, as part of the first electronic message, a virtual image identifier, and one or more instructions that map the virtual image identifier to the dynamic content.

37. An apparatus as recited in claim 34, wherein the sequences of instructions further comprise instructions which, when executed by the processor, cause the processor to carry out the steps of generating, as part of the first electronic message, a tag associated with a universal resource locator that identifies a location of the dynamic content.

38. An apparatus as recited in claim 37, wherein the tag comprises an IFRAME tag or an ILAYER tag.

39. An apparatus as recited in claim 34, wherein the sequences of instructions further comprise instructions which, when executed by the processor, cause the processor to carry out the steps of:

asynchronously receiving one or more second choices from a data source that is external to the data store and the processor;

dynamically updating one of the dynamic content elements of the electronic medium based on the one or more second choices.

40. An apparatus as recited in claim 34, wherein each electronic medium further comprises one or more static content regions that define associated static content stored in the data store.

41. An apparatus as recited in claim 34, wherein the step of receiving information specifying a first open action from a first participant among the selected participants comprises the step of receiving a request from an electronic mail client application program requesting to open the electronic message.

42. An apparatus as recited in claim 34, wherein the first electronic message comprises one or more instructions in hypertext markup language (HTML).

43. An apparatus as recited in claim 34, wherein the first electronic message comprises a name field that identifies network addresses of the selected participants; a subject field that identifies a subject of the electronic message; a plurality of static content elements; and a plurality of dynamic content elements.

44. An apparatus as recited in claim 34, wherein the first electronic message comprises a transport envelope, a plurality of static content regions; a plurality of dynamic content regions; and a plurality of MIME elements that delimit the static content regions and dynamic content regions.

45. An apparatus as recited in claim 44, wherein each dynamic content region is defined by an IFRAME HTML tag or an ILAYER HTML tag.

46. An apparatus as recited in claim 34, wherein the processor is communicatively coupled to a network, the apparatus further comprising:

a second processor that is communicatively coupled to the network and associated with one of the selected participants; and a second memory that is communicatively coupled to the second processor and comprising one or more second sequences of instructions which, when executed by the processor, cause the processor to carry out the steps of:

receiving the first electronic message as an HTML electronic mail message;

parsing and displaying one or more static content elements of the electronic mail message;

issuing one or more HTTP GET requests to retrieve the dynamic content elements from the data store, including the then-current choices;

displaying the dynamic content elements and then-current choices.

47. An apparatus for facilitating choice making by participants, comprising:

means for storing one or more electronic media, each electronic medium having one or more dynamic content elements associated therewith and stored in the data store, each electronic medium comprising one or more choices for selection;

means communicatively coupled to the data store for generating and sending a first electronic message associated with one of the electronic media to one or more selected participants, asynchronously receiving one or more choices of the choices for selection, asynchronously dynamically updating one of the dynamic content elements of electronic medium based on the one or more choices, receiving information specifying a first open action from a first participant among the selected participants, and providing the dynamic content elements from the electronic medium, including all then current choices, to the first participant for display in association with the first electronic message.

48. A computer-readable medium comprising one or more sequences of instructions for facilitating choice making by participants, which instructions, when executed by one or more processors, cause the one or more processors to carry out the steps of:

creating and storing one or more electronic media, each electronic medium having one or more dynamic content elements associated therewith and stored in the data store, each electronic medium comprising one or more choices for selection;

generating and sending a first electronic message to one or more selected participants;

asynchronously receiving, from one or more of the selected participants, one or more selections of choices in the first electronic message;

dynamically updating one of the dynamic content elements of the electronic medium based on the one or more selections;

receiving information specifying a first open action from a first participant among the selected participants;

providing the dynamic content elements, including all then current updates, to the first participant for display in association with the first electronic message.

* * * * *